(12) United States Patent
Sato et al.

(10) Patent No.: US 11,279,021 B2
(45) Date of Patent: Mar. 22, 2022

(54) METHOD AND APPARATUS FOR CONTROLLING ROBOTS

(71) Applicant: DENSO WAVE INCORPORATED, Aichi-pref. (JP)

(72) Inventors: Masanori Sato, Aichi-pref. (JP); Yuto Kawachi, Aichi-pref. (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 130 days.

(21) Appl. No.: 16/585,937

(22) Filed: Sep. 27, 2019

(65) Prior Publication Data

US 2020/0101592 A1    Apr. 2, 2020

(30) Foreign Application Priority Data

Sep. 27, 2018 (JP) .............................. JP2018-181640

(51) Int. Cl.
*B25J 9/00* (2006.01)
*B25J 9/16* (2006.01)

(52) U.S. Cl.
CPC ........... *B25J 9/0081* (2013.01); *B25J 9/1666* (2013.01)

(58) Field of Classification Search
CPC ..... B25J 9/0081; B25J 9/1666; G05B 19/423; G05B 2219/36433; G05B 2219/43203
USPC ............... 700/257, 264, 260, 261; 901/1, 3; 702/41
See application file for complete search history.

(56) References Cited

U.S. PATENT DOCUMENTS

| | | | | |
|---|---|---|---|---|
| 2011/0052366 | A1* | 3/2011 | Bonin | ..................... B25J 9/1676 414/800 |
| 2013/0345872 | A1* | 12/2013 | Brooks | ................... G06F 17/00 700/259 |
| 2018/0361577 | A1* | 12/2018 | Williams | ................. E01H 1/053 |
| 2019/0079482 | A1* | 3/2019 | Huettner | ............ G05B 19/0425 |

FOREIGN PATENT DOCUMENTS

JP    H08-216074 A    8/1996

* cited by examiner

*Primary Examiner* — Dalena Tran
(74) *Attorney, Agent, or Firm* — Oliff PLC

(57) ABSTRACT

A method and apparatus for controlling a robot is provided. In this robot, direct teaching can be performed while updating a position command on the basis of an applied external force. In the method and apparatus, a proximity region is set inside a boundary of an operation-allowed range of the robot, the proximity region being indicative of a proximity of the boundary. Stored is an external force applied when a monitoring point provided in the robot reaches the proximity region as a reference external force. And performed is comparing the reference external force with a current external force when a current position of the monitoring point is in the proximity region, to thereby determine a direction that facilitates movement away from the proximity region.

16 Claims, 13 Drawing Sheets

PROXIMITY REGION IS REACHED

REDUCTION PATTERN A

REDUCTION PATTERN B

REDUCTION PATTERN C

REDUCTION PATTERN D

REDUCTION PATTERN E

REDUCTION PATTERN F

DISTANCE PATTERN

SHAPE PATTERN

METHOD AND APPARATUS FOR CONTROLLING ROBOTS

CROSS-REFERENCE TO RELATED APPLICATION

This application is based on and claims the benefit of priority from earlier Japanese Patent Application No. 2018-181640 filed Sep. 27, 2018, the description of which is incorporated herein by reference.

BACKGROUND

Technical Field

The present invention relates to a method and an apparatus for controlling a robot, such as an industrial robot, to which direct teaching is applicable.

Related Art

In recent years, direct teaching has been adopted as a teaching method for industrial robots, in which an operator teaches the robot by directly operating the robot arm while, in the robot, updating the position command is carried out based on an applied external force given by the direct teaching. A publication of JP-H08-216074 A is an example of the related art.

PATENT REFERENCE

[Patent Reference 1] JP-H08-216074 A

In such direct teaching, position control is performed, by which the position command is updated on the basis of the magnitude and direction of the applied external force. For example, the position command for the end effector position is updated basically on the basis of the direction and magnitude of the applied external force. If the robot deviates from the operation-allowed range during teaching, there is a risk that an excessive load may be applied to the robot arm or the robot arm may come into contact with peripheral devices. Accordingly, in order to prevent operation errors, the movement relative to the applied external force is relatively reduced, that is, the feel of moving the robot is made heavier so that the operator can recognize that an operation-prohibited range is being approached.

However, if the feel is controlled to become heavy when the boundary of the operation-allowed range is approached, the feel is always heavy in a proximity region of the boundary of the operation-allowed range. Accordingly, the feel remains heavy even if the arm moves in an escape direction, that is, a direction moving away from the proximity of the operation-prohibited range. This causes problems that the usability in the proximity region is reduced and moving away from the proximity region becomes difficult.

Further, when the arm reaches the boundary of the operation-allowed range, the robot is stopped as an error. However, in resuming the direct teaching, it is necessary to move the stopped arm into the operation-allowed range by using another control device. Accordingly, the user is forced to perform complicated operations each time when the arm reaches the operation-prohibited range during direct teaching.

In collaborative robots, which allow operators and robots to work together without providing safety guards such as fences around the robot, the operation-allowed range tends to be smaller than that of the conventional industrial robots. For example, the range of motion of the articulation is reduced compared to that of the conventional general industrial robots for safety reasons, or taking a specific posture is prohibited. Accordingly, it is assumed that there are many situations where it is necessary to move the arm at the proximity of the boundary of the operation-allowed range or to move the arm away from the proximity of the boundary during direct teaching. Therefore, ease of moving away from the proximity of the operation-prohibited range is also demanded.

SUMMARY

It is thus desired to provide a method and an apparatus for controlling an industrial robot with improved usability in direct teaching.

According to an exemplary embodiment of the disclosure, a method and apparatus for controlling a robot such as an industrial robot, in which direct teaching is performed while updating a position command on a basis of an applied external force, the method includes: setting a proximity region inside a boundary of an operation-allowed range (simply, an operating range) of the robot, the proximity region being indicative of a proximity of the boundary; storing an external force applied when a monitoring point provided in the robot reaches the proximity region as a reference external force; and comparing the reference external force with a current external force when a current position of the monitoring point is in the proximity region to thereby determine a direction that facilitates movement away from the proximity region.

This method structure can also be provided as an apparatus for controlling a robot as another mode.

In direct teaching, an operator changes the posture of the robot by touching the arm or other part of the robot. Since the posture of the robot can be recognized by the controller, the current position of the monitoring point provided in the robot can be specified from the current posture of the robot. Further, in the configuration for direct teaching, since an external force can be detected by using a sensing device such as a force sensor or a torque sensor, a direction and a magnitude of the applied external force can also be specified.

In order to prevent reaching an operation-prohibited range (simply an outside range of the operating range) during direct teaching, it is effective to limit movement in the proximity region. On the other hand, if movement in the proximity region is completely restricted, movement in a direction away from the proximity region is also restricted, which affects the usability. Therefore, in restricting the operation-prohibited range from being reached, it is desirable to facilitate movement in a direction away from the proximity region. Although a range that the arm of the robot can reach is set as the operation-allowed range, the operation-allowed range may not necessarily be a maximum range, but may be a range that does not interfere with peripheral devices. Therefore, when attempting to move away from the boundary closest to a current position, the arm may approach another boundary. That is, in order to facilitate movement away from the proximity of the operation-prohibited range, it is important to determine in which direction moving out of the operation-allowed range can be prevented, that is, which direction can be used as a reference.

Therefore, an external force applied when the monitoring point reaches the proximity region is stored as a reference external force. Then, the reference external force is compared with the current external force when the current position of the monitoring point is in the proximity region to thereby determine a direction that facilitates movement away from the proximity region. Accordingly, whether the current movement direction is a direction that should be restricted or not can be determined.

Further, the direction of the external force when the monitoring point reaches the proximity region is a direction in which the monitoring point has so far moved. Accordingly, the movement direction indicates a path along which the monitoring position has so far moved, that is, a direction not to meet obstacles when moving away from the proximity region. Therefore, when moving away from the proximity region, that is, the proximity of the operation-prohibited range is desired, a direction of the external force at the time of reaching the proximity region can be used as a reference to specify a direction that does not interfere with peripheral devices. Accordingly, a direction that is opposite to the external force at the time of reaching can be determined or specified as a direction that facilitates movement away from the proximity region.

Thus, in determining the direction that facilitates movement away from the proximity region, it is possible to determine whether the current movement direction is a direction that should be restricted or not, and to specify a direction that facilitates exiting by using the direction of the external force at the time of reaching the proximity region as a reference. Therefore, control can be performed, for example, to restrict movement in the direction toward the operation-prohibited range, and permit movement in the direction that facilitates exiting to thereby improve usability during direct teaching.

According to another exemplary embodiment of the disclosure, a method for controlling a robot, in which direct teaching is performed while updating a position command on a basis of an applied external force, the method includes: setting a proximity region inside a boundary of an operation-allowed range of the robot, the proximity region being indicative of a proximity of the boundary; setting a virtual external force toward the operation-prohibited range starting from a current position as a reference external force on a basis of a shape of a boundary which is closest to a current position or a distance to the boundary; and comparing the reference external force with a current external force when the current position of the monitoring point is in the proximity region to thereby determine a direction that facilitates movement away from the proximity region.

While the proximity region is in the proximity of the operation-prohibited range, there may be a case where it is necessary to change the posture of the robot, that is, to move the monitoring point in the proximity region. As the current position changes in the proximity region, the direction toward the operation-prohibited range from the current position, in other words, the direction in which exiting the proximity region is easy, may also change.

Therefore, a virtual external force toward the operation-prohibited range starting from the current position is set as a reference external force on the basis of the shape of the boundary which is closest to the current position, or the distance to the boundary. The reference external force is compared with the current external force to thereby determine a direction that facilitates movement away from the proximity region. In this case, in order to determine whether the direction is directed to the operation-prohibited range or not, the direction of the reference external force is of importance, and the magnitude thereof is not so important. Therefore, for example, for the magnitude of the reference external force, a reference value can be set in advance or the magnitude of the current external force can be used for convenience.

Thus, a direction toward the closest boundary, starting from the current position, is set as a direction toward the operation-prohibited range. On the basis of the reference external force directed in this direction, the direction that facilitates exiting from the proximity region can be determined to thereby specify whether the current movement direction is a direction that should be restricted or not, and specify a direction that facilitates exiting.

Alternatively, in the case where the closest boundary is formed by a flat surface such as a wall, a direction vertical to the flat surface, starting from the current position, is set as a direction toward the operation-prohibited range. On the basis of the reference external force directed in this direction, the direction that facilitates exiting from the proximity region can be determined to thereby specify whether the current movement direction is a direction that should be restricted or not, and specify a direction that facilitates exiting.

Therefore, control can be performed, for example, to restrict movement in the direction toward the operation-prohibited range, and permit movement in the direction that facilitates exiting to thereby improve usability during direct teaching.

According to another exemplary embodiment of the disclosure, a method for controlling a robot, in which direct teaching is performed while updating a position command on a basis of an applied external force, the method includes: setting a proximity region inside a boundary of an operation-allowed range of the robot, the proximity region being indicative of a proximity of the boundary; setting a virtual external force, starting from a current position of a monitoring point provided in the robot, in a direction from an origin of the robot toward the current position as a reference external force; and comparing the reference external force with a current external force when a current position of the monitoring point is in the proximity region to thereby determine a direction that facilitates movement away from the proximity region.

The operation-allowed range may be set as a range that the arm of the robot can reach. Therefore, a situation can be assumed where the robot arm is fully extended at the boundary of the operation-allowed range. In other words, the direction in which the robot arm is retracted can be regarded as the direction in which it exits the operation-prohibited range. For example, if the robot arm has a reach limit, the direction toward the origin of the robot is taken as the direction in which the arm is retracted, which is the direction in which exiting is easiest.

Therefore, a virtual external force, starting from the current position, in the direction from the origin toward the current position is set as a reference external force. The reference external force is compared with the current external force to thereby determine a direction that facilitates movement away from the proximity region. In this case, for the magnitude of the reference external force, a reference value can be set in advance or the magnitude of the current external force can be used for convenience as described above.

Thus, on the basis of the reference external force directed in the direction from the origin toward the current position, starting from the current position, the direction that facilitates exiting from the proximity region can be determined to thereby specify whether the current movement direction is a direction that should be restricted or not, and specify a direction that facilitates exiting. Therefore, control can be performed, for example, to restrict movement in the direction toward the operation-prohibited range, and permit movement in the direction that facilitates exiting to thereby improve usability during direct teaching.

According to another exemplary embodiment of the disclosure, a method for controlling a robot, in which direct teaching is performed while updating a position command on a basis of an applied external force, the method includes: setting a proximity region inside a boundary of an operation-allowed range of the robot, the proximity region being indicative of a proximity of the boundary; setting a position closest to the boundary, among virtual positions displaced from a current position of a monitoring point provided in the robot by a predetermined distance, as a closest approach position; setting a virtual external force, starting from a current position of the monitoring point, in a direction from the current position toward the closest approach position as a reference external force; and comparing the reference external force with a current external force when the current position of the monitoring point is in the proximity region to thereby determine a direction that facilitates movement away from the proximity region.

While the proximity region is in the proximity of the operation-prohibited range, there may be a case where it is necessary to change the posture of the robot, that is, to move the monitoring point in the proximity region. As the current position changes in the proximity region, the direction toward the operation-prohibited range from the current position, in other words, the direction in which exiting the proximity region is easy, may also change.

Therefore, plurality of virtual positions displaced from the current position by a predetermined distance are obtained by calculation, and a virtual external force, starting from the current position, in the direction toward the closest approach position is set as a reference external force. The reference external force is compared with the current external force to thereby determine a direction that facilitates movement away from the proximity region. In this case, for the magnitude of the reference external force, a reference value can be set in advance or the magnitude of the current external force can be used for convenience as described above.

Thus, the virtual closest approach position closest to the boundary is set, and on the basis of the reference external force, starting from the current position, in the direction toward the closest approach position, the direction that facilitates exiting from the proximity region can be determined to thereby specify whether the current movement direction is a direction that should be restricted or not, and specify a direction that facilitates exiting. Therefore, control can be performed, for example, to restrict movement in the direction toward the operation-prohibited range, and permit movement in the direction that facilitates exiting to thereby improve usability during direct teaching.

DETAILED DESCRIPTION OF THE PREFERRED EMBODIMENTS

Figure 1:
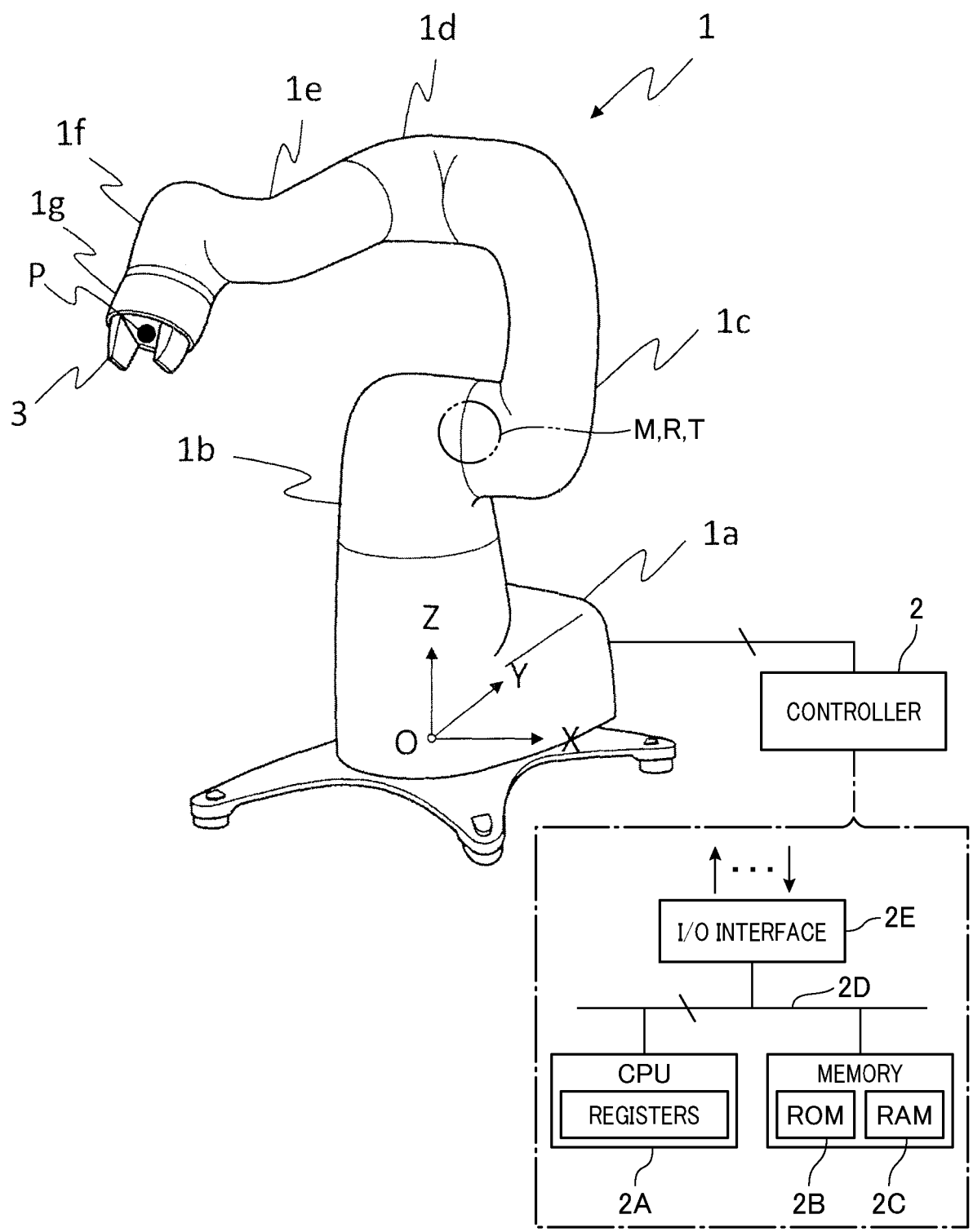
FIG. 1 is a schematic view of a configuration of a robot according to a first embodiment.

With reference to the drawings, a plurality of embodiments will be described. Throughout the embodiments, the same reference numerals are used to refer to substantially the same components.

First Embodiment

Referring to FIGS. 1 to 10, a first embodiment will now be described. As shown in FIG. 1, an industrial robot 1 of the present embodiment is a vertically articulated six-axis robot having a plurality of arms, and is controlled by a controller 2 serving as a robot control apparatus capable of performing control methods according to the present disclosure. In the present embodiment, the robot 1 is assumed to be a collaborative robot (which is an industrial robot), which is installed near the operator's workplace without need of providing a safety guard such as a fence around the robot to work cooperating with the operator.

The robot 1 includes a shoulder 1b connected to a base 1a via a first axis (joint: 31), a lower arm 1c connected to the shoulder 1b via a second axis (joint: 32), a first upper arm 1d connected to the lower arm 1c via a third axis (joint: 33), a second upper arm 1e connected to the first upper arm 1d via a fourth axis (joint: 34), a wrist 1f connected offset from the second upper arm 1e via a fifth axis (joint: 35), and a flange 1g connected to the wrist 1f via a sixth axis (joint: 36).

In the present embodiment and its modifications, a center position of the flange 1g in the space is set as a monitoring point (P) for monitoring a change in posture of the robot 1. Assuming a three dimensional coordinate system having an X axis and a Y axis parallel with an installation surface and a Z axis vertical to the installation surface with the center of the base 1a of the robot 1 as an origin (O), the monitoring point (P) can be obtained by a six-dimensional Cartesian coordinate system represented by coordinates $(P_x, P_y, P_z)$ thereof and rotation components $(R_x, R_y, R_z)$ of the flange 1g.

Further, an external force, which is a force given to the robot from the outside by an operator during the direct teaching, is applied to the monitoring point (P) of the robot 1 can be obtained by the six-dimensional Cartesian coordinate system represented by magnitude components $(F_x, F_y, F_z)$ in each direction and the moment $(M_x, M_y, M_z)$ in the three-dimensional coordinate system. In the present embodiment, since the monitoring point (P) of the robot 1 is specified by a position of the flange 1g, that is, a robot-arm distal end portion, it is conventionally referred to as an end force. However, this end force does not necessarily only refer to an external force applied to the distal end portion of the robot 1, but also refer to a current external force applied to the monitoring point (P) of the robot 1.

The robot 1, in which a work tool 3 (i.e., end effector) is attached to the flange 1g, operates while the posture of the robot 1 is controlled by the controller 2. As known in the art, the controller 2 controls the robot 1 to a desired posture by rotating an electric motor M provided at each of the articulations (joints) of the robot 1, in accordance with information from each of rotational position sensors arranged in the articulations. Hence, the end effector attached to the distal and of the robot arm can take any posture (i.e., any commanded three-dimensional position and direction).

The controller 2 is configured to detect an external force applied to the robot 1 by using a sensing device such as a force sensor R or a torque sensor T provided in the articulations (joints) of the arm of the robot 1, and also to perform direct teaching, in which the operator teaches the operation position by changing the posture (i.e., a position and a direction of the end effector attached to the arm distal end) and by directly touching the arm or the end effector of the robot 1. In each of the articulations (joints) of the arm of the robot 1, a rotational position sensor (not shown) is also arranged to detect a rotational position of each of the articulations. In the robot 1 shown in FIG. 5, the sensors are illustrated as a representative only at one joint to show rough positions thereof, although such sensors are actually provided at all the joints of the robot 1.

By way of example, the controller 2 is provided as a computer system and configured to perform in sequence steps composing a preset control program which includes control of the external force according to the present embodiment. A practical example is shown in FIG. 1, in which the controller 2 is provided with a central processing unit (CPU) 2A, a read-only memory (ROM; such as EEPROM) 2B, a random access memory (RAM) 2C, which are communicably connected to each other via an internal bus 2D. This internal bus 2D is also connected to the sensors and motors via an interface 2E. The CPU 2A functions as functional control means, while the ROM 2B is provided to function as non-transitory computer-readable recording medium in which steps of preset various control programs are stored as source codes in advance. Such programs are read by the CPU 2A into a preset work area in a main memory provided by for example the RAM 2C, with the program steps executed. The RAM 2C is provided as a memory device in which various data processed by the CPU 2A are temporarily. Of course, the foregoing structure of the computer system is just one example, any type of computer systems can be adopted as long as preset control programs can be executed. For example, a plurality of CPUs can be provided for decentralized control or for redundant computer systems. The CPU 2A is a main device for calculation carried out in this computer system, so that, provided that the same kind of functions as those of the CPU 2A is secured, main devices having other device names (such as a processor) can be adopted.

Further, although the details will be described later, the controller 2 (i.e., the CPU 2A) executes a procedure for reducing the external force according to a movement direction of the monitoring point (P) of the robot 1. The reduction in the external force is for providing the operator with a heavier operating feeling when the operator manually moves the arm for the directing teaching. In other words, according to the present embodiment, the controller that controls the robot 1 executes a procedure for reducing an external force (see FIG. 3).

Figure 2:
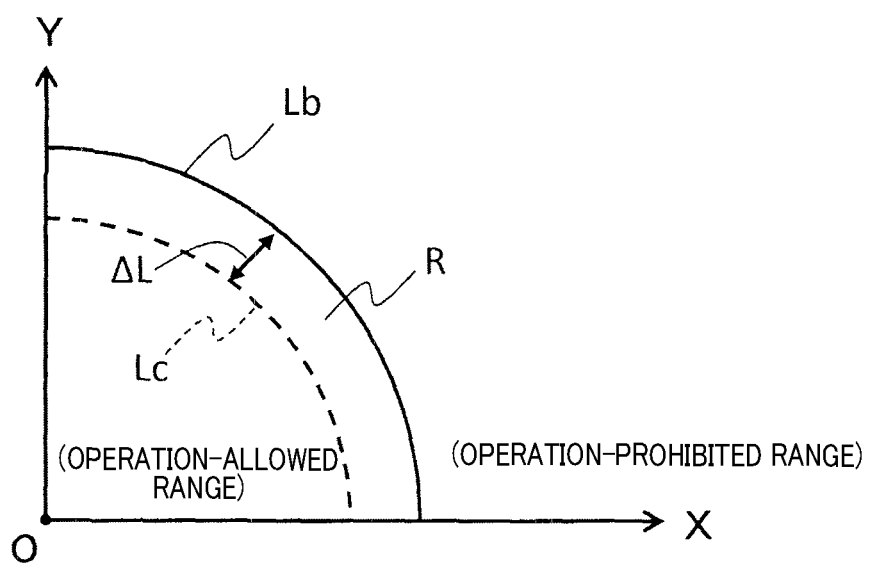
FIG. 2 is a schematic view exemplifying an operation-allowed range of a robot arm.

Next, an effect of the above configuration will be described. In the robot 1, an operation-allowed range (simply an operating range) is preset in the operating space as a range that the arm is physically reachable or a range for preventing the arm from touching surrounding structures. For example, as shown in FIG. 2 in a plan view, the operation-allowed range (the operating range) is set on the basis of a distance from the origin (O). The range from the origin (O) to a boundary line (Lb), which is set at a predetermined distance from the origin (O) (hereinafter, referred to as inside), including the boundary line (Lb), is set as an operation-allowed range, and the range outside the boundary line (Lb) (hereinafter, referred to as outside) is set as an operation-prohibited range (simply an outside range of the operating range). That is, the boundary line (Lb) represents a boundary of the operation-allowed range. The operation-allowed range can also be set for position and/or posture of the robot that are desired to be prohibited due to the configuration and operating environment of the robot, such as angle limit, a singular point, and/or a reach limit of each of the articulations.

Further, in the present embodiment, an inner boundary line (Lc) is set at a position inside the boundary line (Lb) spaced by a predetermined distance difference (ΔL). A range between the boundary line (Lb) and the inner boundary line (Lb), that is, a range obtained by reducing and approximating the operation-allowed range is a proximity region (R) set near and inside the boundary line (Lb). In FIG. 2, the operation-allowed range is shown in a plan view. However, when the monitoring point (P) of the robot 1 moves in the vertical direction as well, the operation-allowed range and the proximity region (R) are three dimensional ranges. Further, the proximity region (R) may also be set including the boundary line (Lb) as long as it does not exceed the boundary line (Lb).

As described above, in direct teaching, an external force required to move the robot can be increased according to the degree of approach to the operation-prohibited range (the outside range of the operating range), that is, the feel when moving the robot can be made heavier to prevent the robot from intruding the operation-prohibited range, leading to improved usability.

However, in this case, the feel is always heavy in the proximity of the boundary of the operation-allowed range. Accordingly, the feel remains heavy even if the arm is moved in an escape direction, that is, a direction moving away from the proximity of the operation-prohibited range, leading to reduction in usability. Further, while the robot needs to be stopped in order to prevent the arm from reaching the operation-prohibited range, it is necessary to move the arm into inside the operation-allowed range by using another control device to resume the direct teaching. Accordingly, the user is forced to perform complicated operations each time when the arm reaches the operation-prohibited range.

In the case of collaborative robots such as the robot 1, the operation-allowed range tends to be smaller. For example, the range of motion of the articulation is reduced for safety reasons, or taking a specific posture is prohibited. Accordingly, it is assumed that there are many situations where it is necessary to move the arm at the proximity of the operation-prohibited range or to move the arm so as to exit the boundary of the operation-allowed range during direct teaching.

Figure 3:
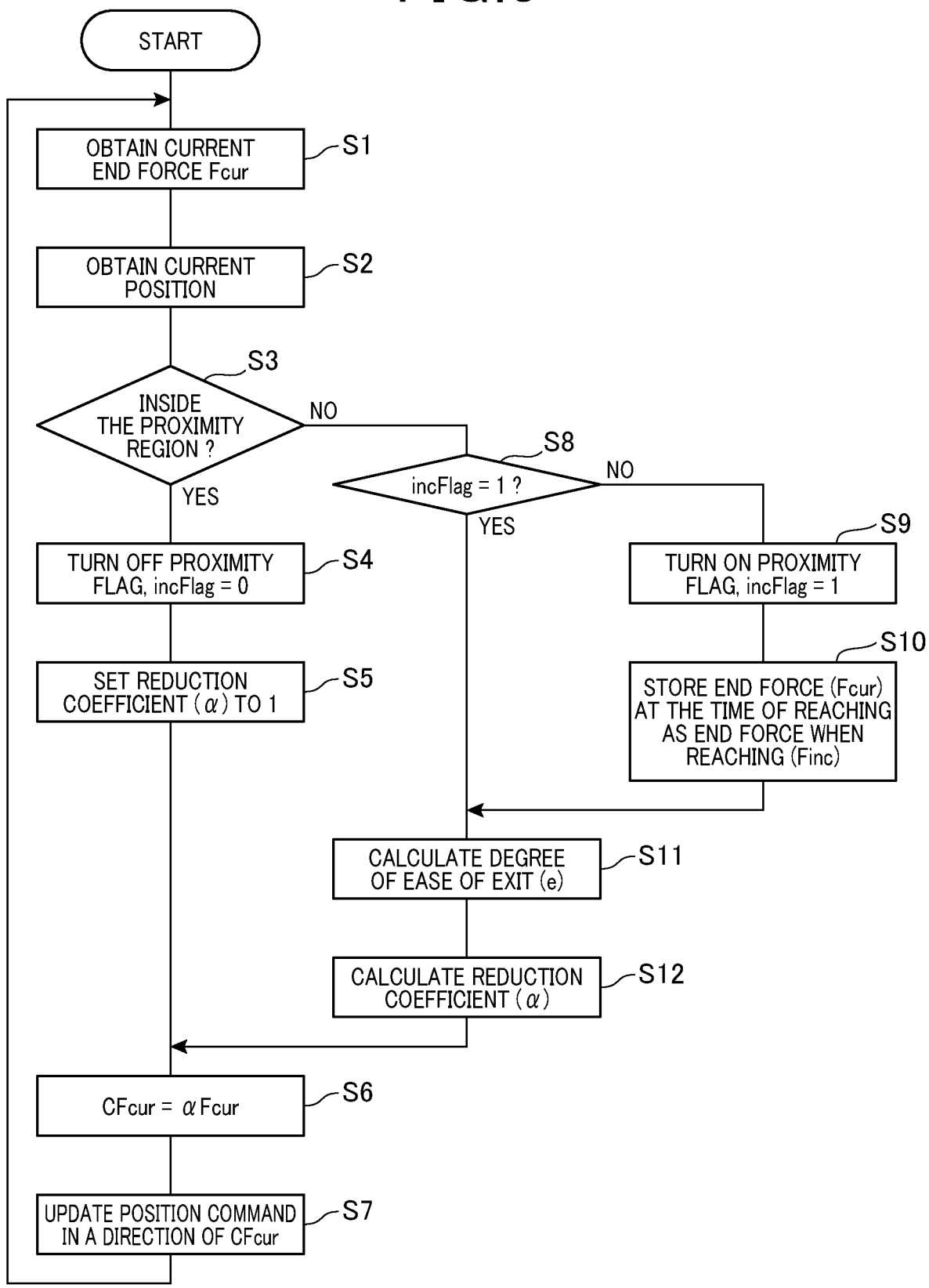
FIG. 3 is a flowchart showing a reduction in an external force which is applied to the robot arm.

In the present embodiment, the controller 2 executes the procedure shown in FIG. 3. In short, this procedure is performed for adjusting an external force, which is, in the present embodiment, an end force which should be applied to the arm end, which is required to move the monitoring point (P) of the robot 1 according to the direction.

Specifically, upon starting the direct teaching, the controller 2 (i.e., CPU 2A) executes, in parallel with the processing for the direct teaching, the procedure to obtain a current end force (Fcur) (step S1), calculate a current position of the current monitoring point (P) based on the rotation angle or the arm or the like (step 2), and determine whether the current position of the monitoring point (P) is located in the operation-allowed range and inside the proximity region, that is, on a side of the proximity region (R) closer to the origin (O) (step S3).

If the current position is determined as being inside the proximity region (step S3: YES), the controller 2 turns off a proximity flag (incFlag) and sets it to 0 (step S4). The proximity flag (incFlag) is turned on and set to 1 when the monitoring point (P) reaches the proximity region (R), and is turned off and set to 0 when the monitoring point (P) exits the proximity region (R). After turning off the proximity flag (incFlag), the controller 2 sets a reduction coefficient ($\alpha$), which indicates the degree of reduction of end force, to 1 (step S5). The reduction coefficient ($\alpha$), which will be detailed later, is a numerical value ranging from 0 to 1, and indicates the degree to which the external force is reduced. The reduction coefficient ($\alpha$)=1 in step S5 means that the external force is not reduced.

Then, the controller 2 calculates a converted end force (CFcur) by multiplying the end force (Fcur) by the reduction coefficient ($\alpha$) (step S6), and updates the position command in the direction of the converted end force (CFcur) (step S7). That is, the controller 2 adjusts the magnitude of the external force required to move the monitoring point (P) by multiplying the reduction coefficient ($\alpha$) to the applied end force (Fcur). However, if the current position is located inside the proximity region, $\alpha$=1, that is, the end force is controlled so as not to be reduced. As the value of the converted end force (CFcur) increases, the external force required for movement decreases, whereas, as the value decreases, the required external force increases.

Figure 4:
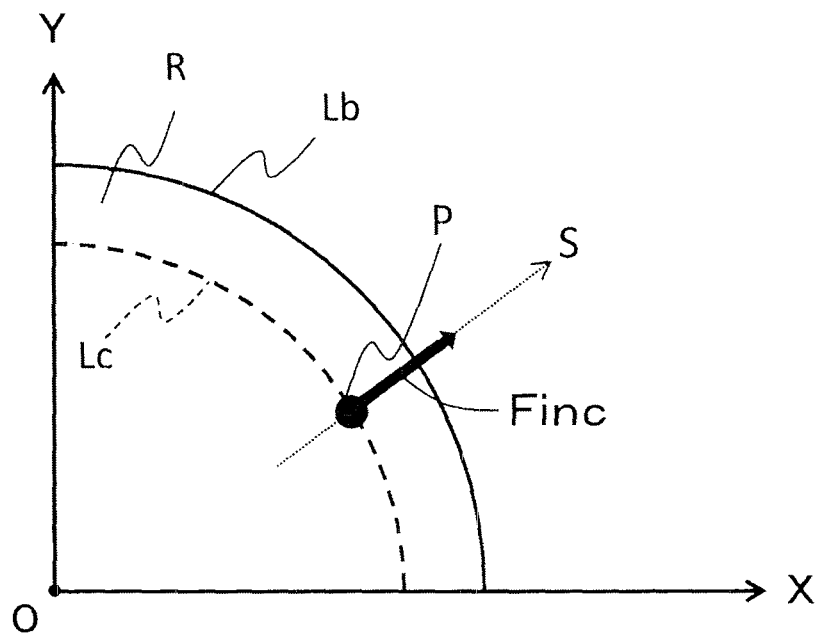
FIG. 4 is a schematic view illustrating an example of a state of a monitoring point which has reached a proximity region.

When the arm moves and the monitoring point (P) reaches the proximity region (R), which is for example shown in FIG. 4 as "proximity region is reached," the current position of the monitoring point (P) is not inside the proximity region any more (step S3: NO). Then, the controller 2 determines whether the proximity flag (incFlag) is 1 (step S8). In FIG. 4, the dotted arrow S indicates the current movement direction of the monitoring point (P).

Subsequently, since the flag (incFlag) is 0 (step S8: NO) when the arm first reaches the proximity region (R), the controller 2 turns on the proximity flag (incFlag) and sets it to 1 (step S9), and then stores the end force (Fcur) at the time of reaching the proximity region (R) as an end force in reaching (Finc), which is obtained by the six dimensional Cartesian coordinate system (step S10). The end force in reaching (Finc) corresponds to a reference external force in the present embodiment.

Then, the controller 2 calculates a degree of ease of exit (e) by obtaining an inner product of the current end force (Fcur) and an inverse end force (−Finc), which is an inverse end force in reaching (Finc) (step S11). That is, the degree of ease of exit (e) is a value obtained as an inner product value of a vector of the current external force and an inverse vector of the reference external force. The degree of ease of exit (e), in simple terms, is a parameter for adjusting the magnitude of the force required to move the monitoring point (P), and is used for control when the monitoring point (P) is located in the proximity region (R). In addition, the inner product may also be obtained only by the components of the three-dimensional coordinate system, excluding the rotation component. The same applies to other embodiments.

When the monitoring point (P) moves in the same direction as the end force in reaching (Finc), the direction is regarded as a direction toward the operation-prohibited range. On the other hand, when the monitoring point (P) moves in a direction opposite to the end force in reaching (Finc), the direction is regarded as a direction moving away from the proximity of the operation-prohibited range. Therefore, in the proximity region (R), movement in the direction of the end force in reaching (Finc) should be suppressed in order to prevent movement toward the operation-prohibited range.

On the other hand, movement in a direction opposite to the end force in reaching (Finc) does not need to be suppressed in order to facilitate exiting the proximity of the operation-prohibited range. In addition, by decreasing the external force required to move in the direction away from the boundary line (Lb) of the operation-allowed range relative to the external force required to move toward the operation-prohibited range, the direction to move becomes tactile and intuitively recognizable. Accordingly, it is possible to smoothly move away from the proximity of the operation-prohibited range.

For this reason, the controller 2 calculates the degree of ease of exit (e) by obtaining an inner product of the current end force (Fcur) and an inverse end force (−Finc), which is an inverse end force in reaching (Finc). The degree of ease of exit (e) calculated by obtaining the inner product approaches 1 in the direction that facilitates exiting, that is, the direction opposite to that at the time of reaching, whereas it approaches −1 in the direction that restricts exiting or makes exiting difficult, that is, the direction which is the same as that at the time of reaching. More specifically, when equal to 0, the degree of ease of exit (e) indicates a direction vertical to the end force in reaching (Finc). When larger than 0, it indicates a direction moving away from the operation-prohibited range. When smaller than 0, it indicates a direction moving toward the operation-prohibited range.

In other words, whether the movement direction of the monitoring point (P) is a direction moving toward the operation-prohibited range can be determined depending on whether the degree of ease of exit (e) is 0, positive, or negative. Accordingly, the controller 2 calculates the degree of ease of exit (e) in step S10 to thereby determine whether the movement direction of the monitoring point (P) is a direction moving toward the operation-prohibited range. The end force (Fcur) and the end force in reaching (Finc) are equal when the arm first reaches the proximity region.

After calculating the degree of ease of exit (e), the controller 2 calculates the reduction coefficient ($\alpha$) (step S12). As described above, the reduction coefficient ($\alpha$) is a numerical value ranging from 0 to 1, and indicates the degree to which the external force is reduced by multiplying the current end force (Fcur). More specifically, when the reduction coefficient ($\alpha$)=1, the external force is not reduced and the position command is updated to move by a predetermined distance corresponding to the magnitude of the applied external force. Accordingly, the feel during operation does not change. On the other hand, when the reduction coefficient ($\alpha$) is less than 1, the external force is reduced and the position command is updated to move by a relatively small distance when the same external force is applied. Accordingly, the feel during operation is relatively heavy.

Thus, by multiplying the current end force (Fcur) by the reduction coefficient (α), movement in a direction toward the operation-prohibited range can be made difficult, and movement in a direction away from the operation-prohibited range can be facilitated when the current position of the monitoring point (P) is in the proximity region (R).

The degree of ease of exit (e), which is a numerical value ranging from −1 to +1 as described above, is advantageous in that the value itself can be used as a parameter indicating the direction in which exiting is facilitated, or a parameter indicating the direction to guide for avoiding a collision. For example, when the degree of ease of exit (e) is positive, the current external force is simply multiplied by the degree of ease of exit (e) so that movement in the direction away from the proximity region (R) is not restricted while movement in the direction toward the operation-prohibited range is restricted.

On the other hand, since the current movement direction is a direction that the operator desires, there may be situations where the restriction on the movement in the direction toward the operation-prohibited range does not necessarily meet the operator's desire. As described above, if the arm reaches the operation-prohibited range, the robot 1 stops as an error. Therefore, reaching the operation-prohibited range should be avoided. However, even if the feel during operation is made relatively heavy, it is assumed that movement itself is permitted, so there may be situations where the operation-prohibited range is reached.

Further, in the case of collaborative robots such as the robot 1, the operation-allowed range tends to be smaller than that of the conventional industrial robots. For example, the range of motion of the articulation is reduced compared to that of the conventional general industrial robots for safety reasons, or taking a specific posture is prohibited. Accordingly, it is assumed that there may be a risk of unintentional movement to reach the operation-prohibited range.

It is considered that these situations also depend on the size of the proximity region (R), that is, a distance (ΔL) from the boundary. In the present embodiment, in order to cope with various situations, the reduction coefficient (α) can be calculated by a plurality of patterns described below. Hereinafter, the patterns will be respectively described as reduction patterns A to F. While any one of these reduction patterns A to F can be adopted, a plurality of patterns can also be adopted by changing the pattern depending on the distance between the current position and the boundary.

<Reduction Pattern A: See FIG. 5>

In the reduction pattern A, when the degree of ease of exit (e) is 0 or more, the position command is updated on the basis of the current external force (Fcur). More specifically, when the degree of ease of exit (e) is 0 or more, the reduction coefficient (α)=1 so that the converted external force (CFcur) calculated in step S6 becomes equal to the current external force (Fcur), that is, the external force is not reduced.

On the other hand, when the degree of ease of exit (e) is negative, the reduction coefficient (α)=k, where k is a degree of approach (k) that becomes 0 at the boundary and approaches 1 as it is farther away from the boundary, so that the converted external force (CFcur) calculated in step S6 becomes a value of the current external force (Fcur) multiplied by the degree of approach (k), that is, the external force is reduced.

Figure 5:
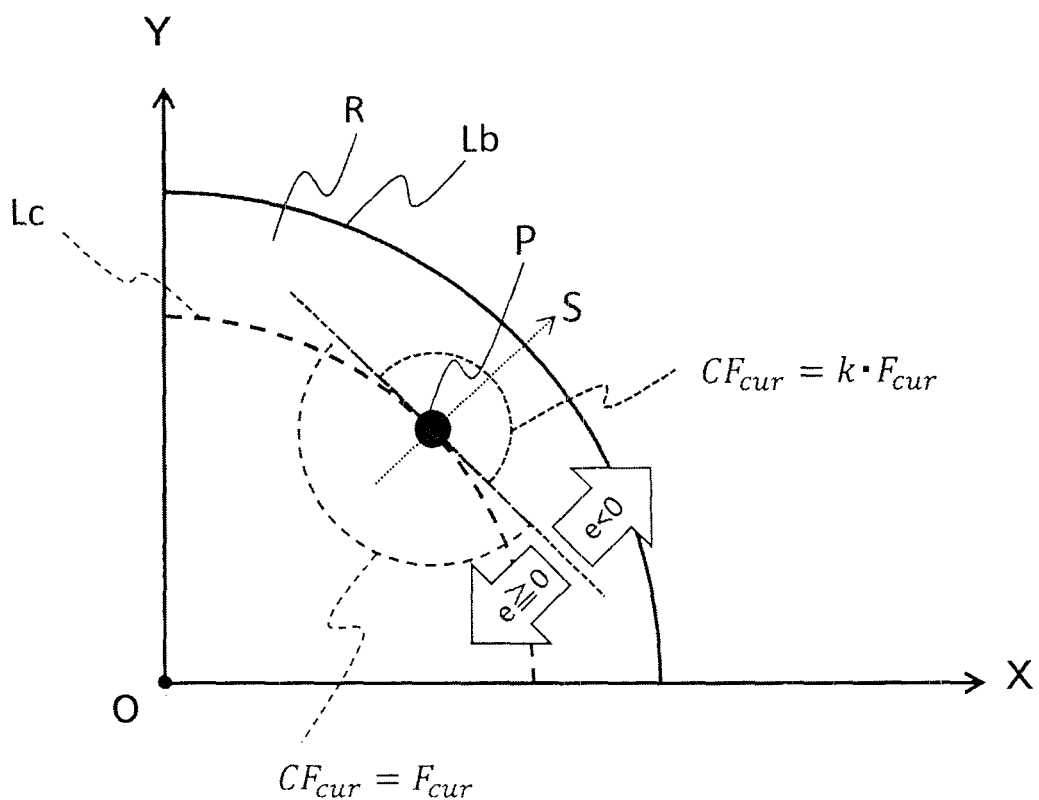
FIG. 5 is a diagram illustrating a reduction pattern A on which a reduction coefficient is calculated.

In this case, as indicated by the dotted line in FIG. 5, when the current external force (Fcur) is in a direction toward inside a plane (e=0), which is vertical to the movement direction (S) at the time of reaching the proximity region (R), the converted external force (CFcur) can be in the range that corresponds to the current external force (Fcur). Since the position command is updated on the basis of the current external force (Fcur), the feel during operation does not become heavy in the direction moving back to the operation-allowed range from the proximity of the operation-prohibited range, and constantly remains light.

Further, when the current external force (Fcur) is in a direction toward outside the plane (e=0), which is vertical to the movement direction (S) at the time of reaching the proximity region (R), the converted external force (CFcur) can be in the range of the current external force (Fcur) multiplied by the degree of approach (k). Since the position command is updated on the basis of the converted external force (CFcur), which is reduced from the current external force (Fcur), the feel during operation constantly remains heavy in the direction toward the operation-prohibited range.

By making the feel during operation heavier as it is closer to the operation-prohibited range, it is possible to physically limit the movement toward the operation-prohibited range, and inform the operator that the operation-prohibited range is approached.

Accordingly, the operator can avoid or carefully perform movement in such a direction, and thus a risk of moving out of the operation-allowed range can be reduced. Further, since movement in the direction away from the operation-prohibited range is not limited, it is possible to easily exit the operation-prohibited range. Therefore, operation errors during direct teaching can be reduced, and the usability can be improved. This control method is particularly effective when the distance difference (ΔL) from the boundary is large to some extent, and movement in the proximity region (R) is assumed.

<Reduction Pattern B: See FIG. 6>

In the reduction pattern B, when the degree of ease of exit (e) is 0 or more, the position command is updated on the basis of the current external force (Fcur) as with the reduction pattern A so that the external force is not reduced. On the other hand, when the degree of ease of exit (e) is negative, the reduction coefficient (α)=0.

Figure 6:
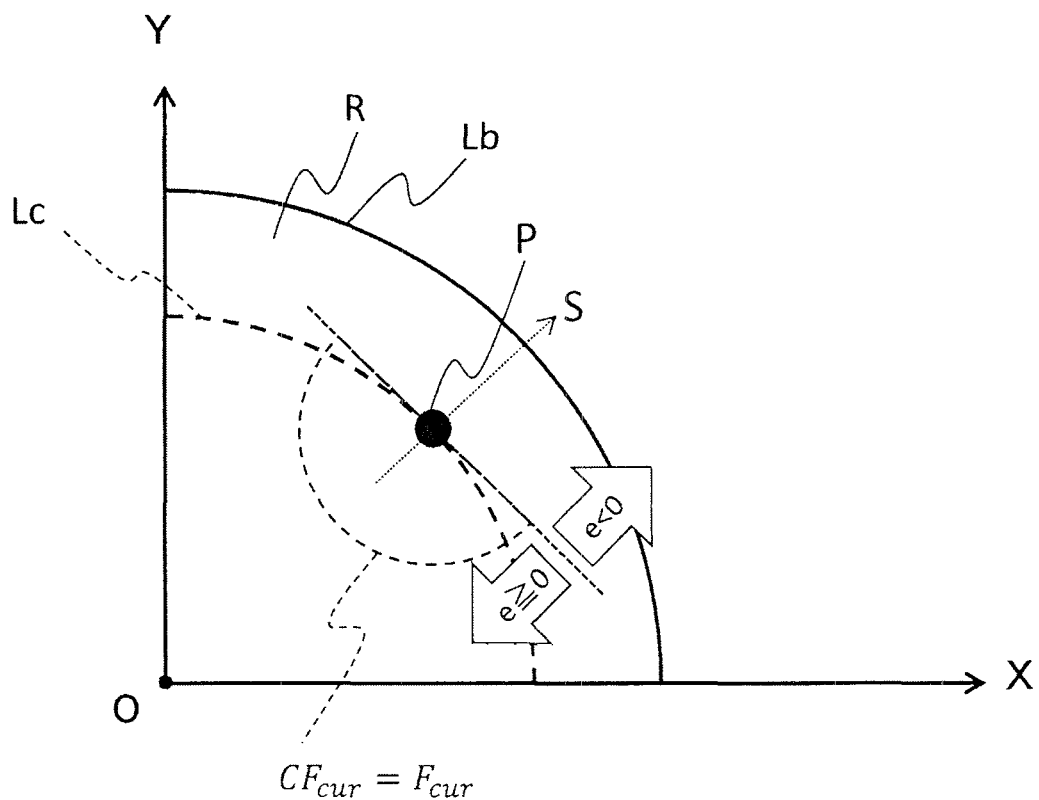
FIG. 6 is a diagram illustrating a reduction pattern B on which a reduction coefficient is calculated.

In this case, as indicated by the dotted line in FIG. 6, when the current external force (Fcur) is in a direction toward inside a plane (e=0), which is vertical to the movement direction (S) at the time of reaching the proximity region (R), the converted external force (CFcur) can be in the range that corresponds to the current external force (Fcur). On the other hand, when the current external force (Fcur) is in a direction toward outside the plane (e=0), which is vertical to the movement direction (S) at the time of reaching the proximity region (R), the converted external force (CFcur) becomes 0. Accordingly, movement in such a direction is regulated.

By regulating movement in the direction toward the operation-prohibited range, it is possible to restrict the operation-prohibited range from being reached, and inform the operator that the movement is in a direction toward the operation-prohibited range. Accordingly, the operator can stop the movement in such a direction, and thus moving out of the operation-allowed range can be prevented. Further, since movement in the direction away from the operation-prohibited range is not limited, it is possible to easily exit the operation-prohibited range. Therefore, operation errors during direct teaching can be reduced, and the usability can be improved. This control method is particularly effective when the distance difference (ΔL) from the boundary is small.

<Reduction Pattern C: See FIG. 7>

In the reduction pattern C, when the degree of ease of exit (e) is 0 or more, the position command is updated on the basis of the current external force (Fcur) as with the reduction pattern A so that the external force is not reduced.

On the other hand, when the degree of ease of exit (e) is negative, the reduction coefficient (α)=|e|·k so that the converted external force (CFcur) calculated in step S6 becomes a value of the current external force (Fcur) multiplied by an absolute value (|e|) of the degree of ease of exit (e) and the degree of approach (k), that is, the external force is reduced.

Figure 7:
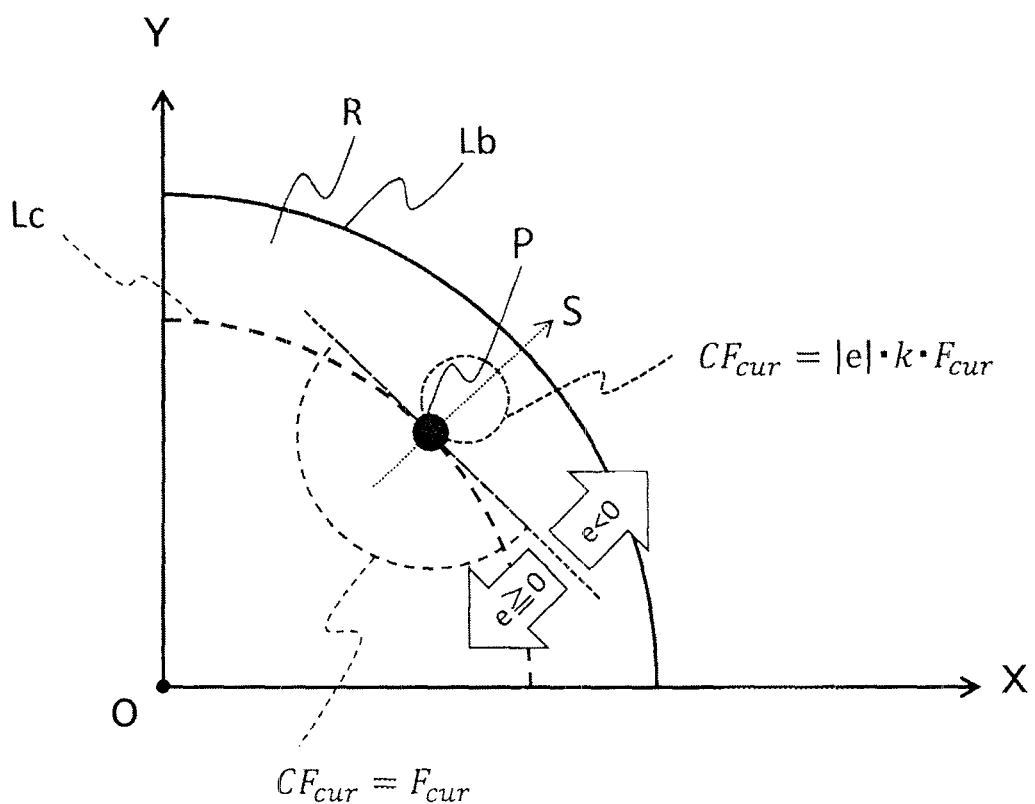
FIG. 7 is a diagram illustrating a reduction pattern C on which a reduction coefficient is calculated.

In this case, as indicated by the dotted line in FIG. 7, when the current external force (Fcur) is in a direction toward inside the plane (e=0), which is vertical to the movement direction (S) at the time of reaching the proximity region (R), the converted external force (CFcur) can be in the range that corresponds to the current external force (Fcur). On the other hand, when the current external force (Fcur) is in a direction toward outside the plane (e=0), which is vertical to the movement direction (S) at the time of reaching the proximity region (R), movement in the same direction as the movement direction (S) at the time of reaching the proximity region (R) is permitted to some extent, and movement is more restricted as it is farther away from the movement direction (S).

By restricting movement in the direction toward the operation-prohibited range on the basis of the relationship between the movement and the movement direction (S), it is possible to permit, to some extent, movement in the movement direction (S), that is, the direction that the operator desires, while restricting the operation-prohibited range from being reached by making the feel heavy. Further, since movement in the direction away from the operation-prohibited range is not limited, it is possible to easily exit the operation-prohibited range. Therefore, operation errors during direct teaching can be reduced, and the usability can be improved. This control method is particularly effective when movement in the proximity region (R) is desired to be permitted to some extent.

<Reduction Pattern D: See FIG. 8>

In the reduction pattern D, when the degree of ease of exit (e) is 0 or more, the reduction coefficient (α)=e so that the converted external force (CFcur) calculated in step S6 becomes a value of the current external force (Fcur) multiplied by the degree of ease of exit (e), and the position command is updated on the basis of the converted external force (CFcur), which is reduced from the current external force (Fcur).

On the other hand, when the degree of ease of exit (e) is negative, the reduction coefficient (α)=k so that the converted external force (CFcur), which is calculated in step S6 becomes a value of the current external force (Fcur) multiplied by the degree of approach (k), that is, the external force is reduced.

Figure 8:
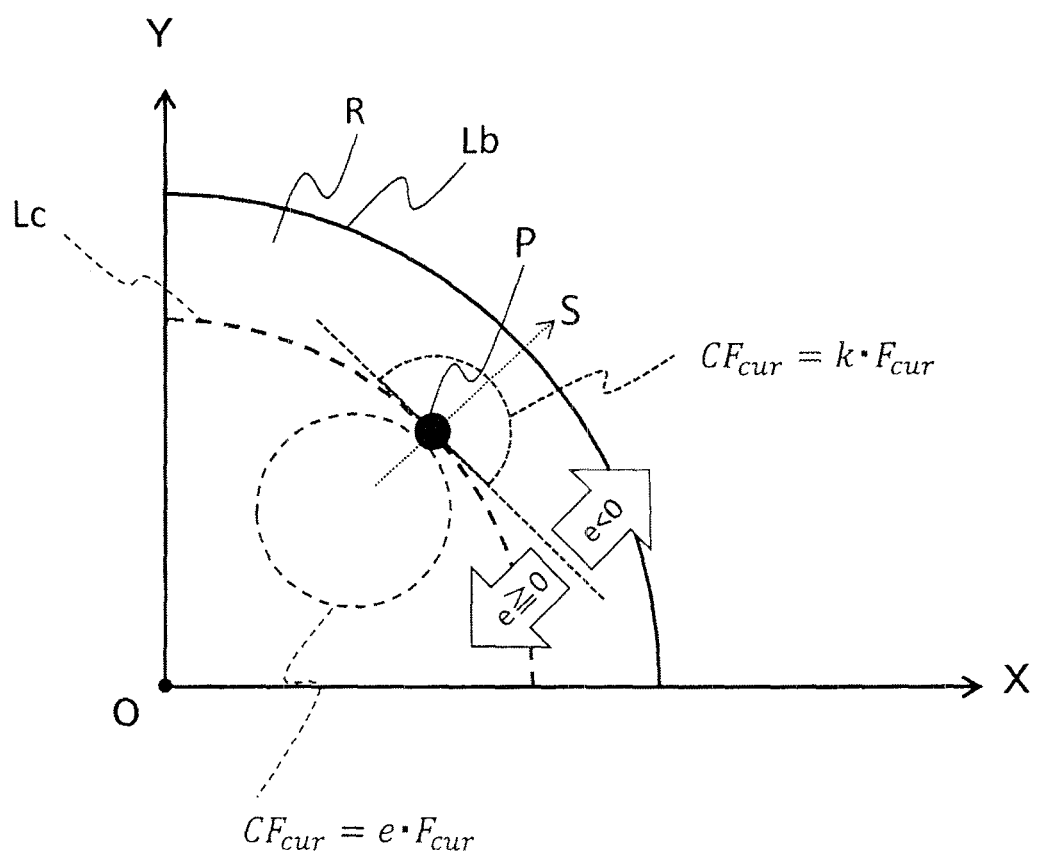
FIG. 8 is a diagram illustrating a reduction pattern D on which a reduction coefficient is calculated.

In this case, as indicated by the dotted line in FIG. 8, when the current external force (Fcur) is in a direction toward inside the plane (e=0), which is vertical to the movement direction (S) at the time of reaching the proximity region (R), the position command is updated on the basis of the current external force (Fcur) in a direction opposite to the movement direction (S), and the position command is updated to be more reduced as it is farther away from the direction opposite to the movement direction (S). That is, while movement in the direction opposite to the movement direction (S) is not limited, movement is more limited as it is farther away from the direction opposite to the movement direction (S).

Further, when the current external force (Fcur) is in a direction toward outside the plane (e=0), which is vertical to the movement direction (S) at the time of reaching the proximity region (R), the converted external force (CFcur) can be in the range of the current external force (Fcur) multiplied by the degree of approach (k). Since the position command is updated on the basis of the converted external force (CFcur), which is reduced from the current external force (Fcur), the feel during operation constantly remains heavy in the direction toward the operation-prohibited range.

By restricting movement in the direction toward the operation-prohibited range while permitting movement in the direction away from the operation-prohibited range such that movement in the direction opposite to the movement direction (S) at the time of reaching can be most easily performed, operation errors during direct teaching can be reduced, and the usability can be improved. This control method is particularly effective for the case where early or urgent exiting is desired when the proximity region (R) has been reached.

<Reduction Pattern E: See FIG. 9>

In the reduction pattern E, when the degree of ease of exit (e) is 0 or more, the reduction coefficient (α)=e so that the converted external force (CFcur) calculated in step S6 becomes a value of the current external force (Fcur) multiplied by the degree of ease of exit (e), and the position command is updated on the basis of the converted external force (CFcur), which is reduced from the current external force (Fcur). On the other hand, when the degree of ease of exit (e) is negative, the reduction coefficient (α)=0.

Figure 9:
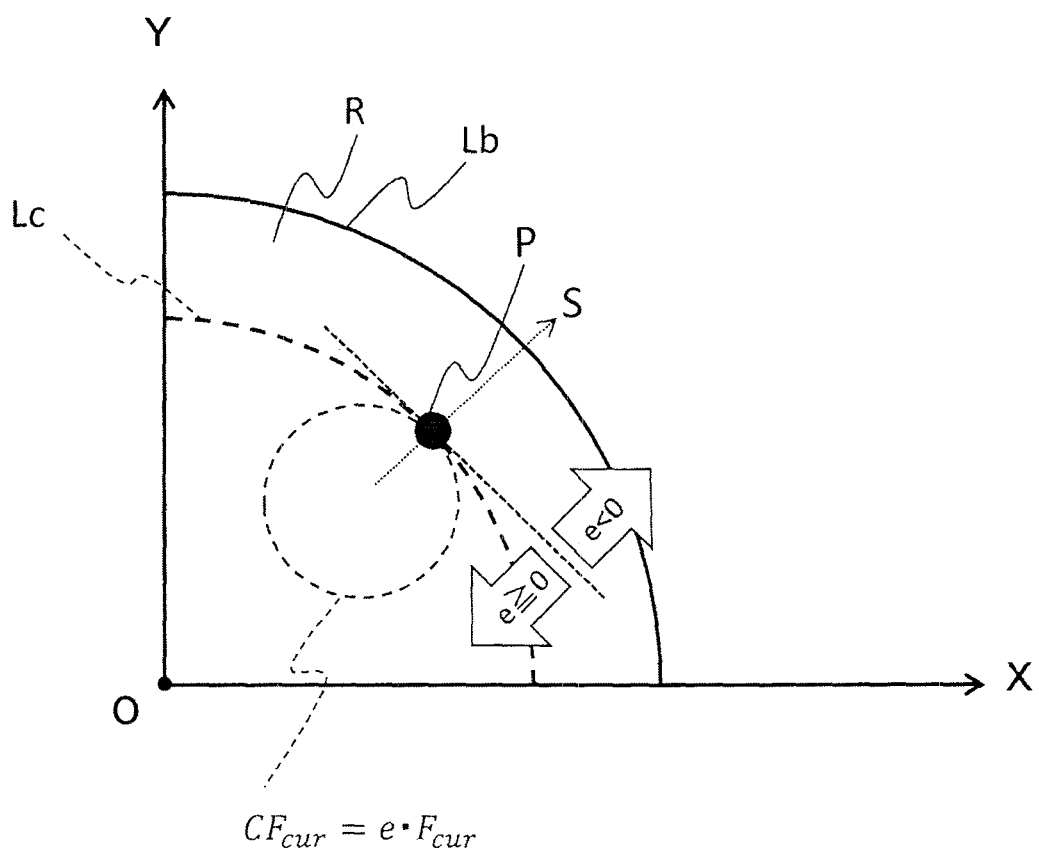
FIG. 9 is a diagram illustrating a reduction pattern E on which a reduction coefficient is calculated.

In this case, as indicated by the dotted line in FIG. 9, when the current external force (Fcur) is in a direction toward inside the plane (e=0), which is vertical to the movement direction (S) at the time of reaching the proximity region (R), the position command is updated on the basis of the current external force (Fcur) in a direction opposite to the movement direction (S), and the position command is updated to be more reduced as it is farther away from the direction opposite to the movement direction (S). That is, while movement in the direction opposite to the movement direction (S) is not limited, movement is more limited as it is farther away from the direction opposite to the movement direction (S). Further, movement in the direction toward the operation-prohibited range is regulated.

Thus, while movement in the direction toward the operation-prohibited range is regulated, movement in the direction away from the operation-prohibited range is permitted such that movement in the direction opposite to the movement direction (S) at the time of reaching can be most easily performed. Therefore, operation errors during direct teaching can be reduced, and the usability can be prevented from decreasing. This control method is particularly effective for the case where early or urgent exiting is desired when the proximity region (R) has been reached.

<Reduction Pattern F: See FIG. 10>

In the reduction pattern E, when the degree of ease of exit (e) is 0 or more, the reduction coefficient (α)=e so that the converted external force (CFcur) calculated in step S6 becomes a value of the current external force (Fcur) multiplied by the degree of ease of exit (e), and the position command is updated on the basis of the converted external force (CFcur), which is reduced from the current external force (Fcur).

On the other hand, when the degree of ease of exit (e) is negative, the reduction coefficient ($\alpha$)=|e|·k so that the converted external force (CFcur) calculated in step S6 becomes a value of the current external force (Fcur) multiplied by an absolute value (|e|) of the degree of ease of exit (e) and the degree of approach (k), that is, the external force is reduced.

Figure 10:
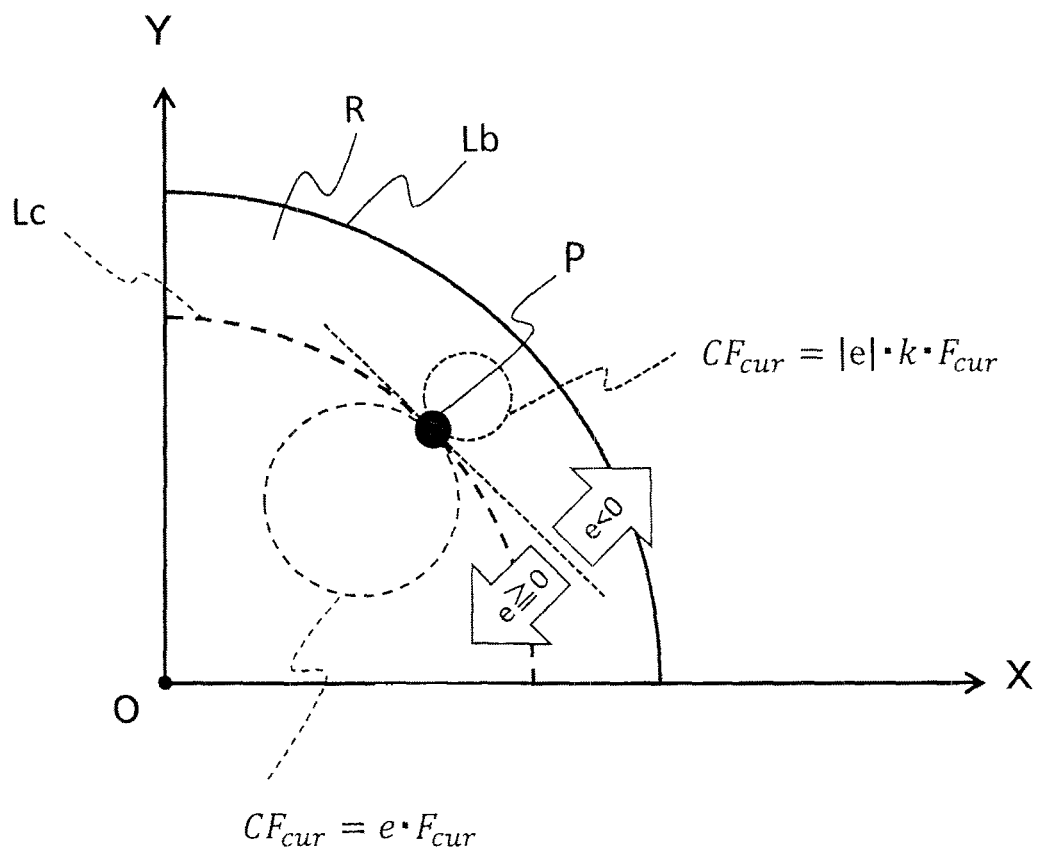
FIG. 10 is a diagram illustrating a reduction pattern F on which a reduction coefficient is calculated.

In this case, as indicated by the dotted line in FIG. 10, when the current external force (Fcur) is in a direction toward inside the plane (e=0), which is vertical to the movement direction (S) at the time of reaching the proximity region (R), the position command is updated on the basis of the current external force (Fcur) in a direction opposite to the movement direction (S), and the position command is updated to be more reduced as it is farther away from the direction opposite to the movement direction (S). That is, while movement in the direction opposite to the movement direction (S) is not limited, movement is more limited as it is farther away from the direction opposite to the movement direction (S).

When the current external force (Fcur) is in a direction toward outside the plane (e=0), which is vertical to the movement direction (S) at the time of reaching the proximity region (R), movement in the same direction as the movement direction (S) is permitted to some extent, and movement is more restricted as it is farther away from the movement direction (S).

By restricting movement in the direction toward the operation-prohibited range and movement in the direction away from the operation-prohibited range on the basis of the relationship between the movement and the movement direction (S), it is possible to permit, to some extent, movement in the movement direction (S), that is, the direction that the operator desires, while restricting the operation-prohibited range from being reached by making the feel heavy. Further, it is possible to permit movement in the direction away from the operation-prohibited range such that movement in the direction opposite to the movement direction (S) at the time of reaching can be most easily performed. Therefore, operation errors during direct teaching can be reduced, and the usability can be prevented from decreasing. This control method is particularly effective when movement in the proximity region (R) is desired to be permitted to some extent.

Although not shown in the procedure in FIG. 3, when the current position of the monitoring point (P) reaches the boundary of the operation-allowed range, the position command is updated on the basis of the converted external force (Fcur=0) obtained by multiplying the current external force (Fcur) by 0 without calculating the reduction coefficient ($\alpha$) if the current external force (Fcur) is in a direction toward the operation-prohibited range to thereby prohibit movement in such a direction. If it is in a direction away from the boundary, the position command is updated on the basis of the current external force (Fcur). Accordingly, moving out of the operation-allowed range can be rapidly prevented.

After calculating the reduction coefficient ($\alpha$) as described above, the controller 2 proceeds to step S6 as shown in FIG. 3 to calculate the converted external force (CFcur), and updates the position command on the basis of the calculated converted external force (CFcur) (S7). Then, the controller 2 returns to step S1 and repeats the procedure to adjust the external force required to move the monitoring point (P), that is, reduce the external force as required.

According to the control method described above, the following effects can be achieved. The method for controlling the robot 1 includes: setting a proximity region inside a boundary of an operation-allowed range of the robot, the proximity region being indicative of a proximity of the boundary; storing an external force applied when a monitoring point provided in the robot reaches the proximity region as a reference external force; and comparing the reference external force with a current external force when a current position of the monitoring point is in the proximity region to thereby determine a direction that facilitates movement away from the proximity region.

In direct teaching, an operator changes the posture of the robot by touching the arm or other part of the robot. Since the posture of the robot can be recognized by the controller, the current position of the monitoring point provided in the robot can be specified from the current posture of the robot. Further, in the configuration capable of performing direct teaching, since an external force can be detected by using a sensing device such as a force sensor or a torque sensor, a direction and a magnitude of the applied external force can also be specified.

In order to prevent reaching the operation-prohibited range during direct teaching, it is effective to limit movement in the proximity region. On the other hand, if movement in the proximity region is completely restricted, movement in a direction away from the proximity region is also restricted, which affects the usability. Therefore, in restricting the operation-prohibited range from being reached, it is desirable to facilitate movement in a direction away from the proximity region.

Although a range that the arm of the robot can reach is set as the operation-allowed range, the operation-allowed range may not necessarily be a maximum range, but may be a range that does not interfere with peripheral devices. Therefore, when attempting to move away from the boundary closest to a current position, the arm may approach another boundary. That is, in order to facilitate movement away from the proximity of the operation-prohibited range, it is important to determine in which direction moving out of the operation-allowed range can be prevented, that is, which direction can be used as a reference.

Therefore, an external force applied when the monitoring point reaches the proximity region is stored as a reference external force. Then, the reference external force is compared with the current external force when the current position of the monitoring point is in the proximity region to thereby determine a direction that facilitates movement away from the proximity region. Accordingly, whether the current movement direction is a direction that should be restricted or not can be determined.

Further, the direction of the external force when the monitoring point reaches the proximity region is a direction in which the monitoring point has so far moved. Accordingly, the movement direction indicates a path along which the monitoring position has so far moved, that is, a direction not to meet obstacles when moving away from the proximity region. Therefore, when moving away from the proximity region, that is, the proximity of the operation-prohibited range is desired, a direction of the external force at the time of reaching the proximity region can be used as a reference to specify a direction that does not interfere with peripheral devices, that is, a direction that facilitates exiting.

Thus, in determining the direction that facilitates movement away from the proximity region, it is possible to determine whether the current movement direction is a direction that should be restricted or not, and to specify a direction that facilitates exiting by using the direction of the external force at the time of reaching the proximity region as a reference. Therefore, control can be performed, for example, to restrict movement in the direction toward the operation-prohibited range, and permit movement in the direction that facilitates exiting to thereby prevent the operation-prohibited range is unintentionally reached so that teaching operation does not suspended due to an error. Accordingly, the usability in direct teaching can be improved.

In addition, since the direction of the external force at the time of reaching the proximity region is used as a reference, there is no need to store the detailed movement positions of the monitoring point (P), and thus an excessive increase in processing load can be prevented. This is particularly effective in direct teaching, which is assumed to include a situation where the last movement path is directed from the outside to inside of the operation-allowed range due to the operator's hand shakes or returning from a position that has slightly deviated outside during teaching.

Furthermore, the method for controlling the robot 1 includes: calculating an inner product of a vector of the current external force and an inverse vector of the reference external force; and determining that movement is in a direction away from the operation-prohibited range if the calculated inner product value is 0 or more, and that movement is in a direction toward the operation-prohibited range if the calculated inner product value is negative. The inner product of the two vectors becomes a positive value if the directions are the same, and becomes a negative value if the directions are opposite to each other.

Accordingly, when the inner product value of the vector of the current external force and the inverse vector of the reference external force is a negative value, it indicates that the current external force is in the direction of the reference external force, that is, the direction toward the operation-prohibited range. On the other hand, when the inner product value is 0 or more, it indicates that the current external force is not in the direction toward the operation-prohibited range. Accordingly, by using the inner product value, a direction that facilitates movement away from the proximity region can be easily determined.

Furthermore, the method for controlling the robot 1 includes: calculating a degree of ease of exit by obtaining an inner product of a vector of the current external force and an inverse vector of the reference external force, in which an inner product value, which is a smallest negative value in a same direction as the reference external force and a largest positive value in an opposite direction to the reference external force, is taken as the degree of ease of exit. In this case, when the degree of ease of exit is positive, the external force is in a direction away from the operation-prohibited range, and when the degree of ease of exit is 0, the external force is not directed to the operation-prohibited range. Accordingly, there is no need to restrict movement. On the other hand, when the degree of ease of exit is negative, the external force is in a direction toward the operation-prohibited range. Accordingly, it is desired to restrict movement so as not to move out of the operation-allowed range.

Accordingly, when the degree of ease of exit is 0 or more, the position command is updated on the basis of the current external force so as not to restrict movement in the direction. When the degree of ease of exit is negative, the position command is updated on the basis of the converted external force obtained by multiplying the current external force by a degree of approach, which becomes 0 at the boundary and approaches 1 as it is farther away from the boundary. Thus, movement is restricted by reducing the external force as it is closer to the boundary.

In this case, the feel in movement becomes relatively light in the direction in which exiting is easy since the converted end force (CFcur) increases, whereas the feel in movement becomes relatively heavy in the direction in which exiting is difficult since the converted end force decreases. Thus, movement in the direction toward the operation-prohibited range can be restricted to thereby restrict the operation-prohibited range from being reached, whereas movement in the direction away from the operation-prohibited range can be easy. In addition, a direction to move, avoiding a direction toward the operation-prohibited range, can be indicated in a manner tactile and easily recognizable.

Furthermore, the method for controlling the robot 1 includes updating the position command on a basis of the current external force when the degree of ease of exit is 0 or more so as not to limit movement in a direction away from the operation-prohibited range, and updating the position command on a basis of a converted external force obtained by multiplying the current external force by 0 when the degree of ease of exit is negative so as to prohibit movement in the direction. Thus, movement in the direction toward the operation-prohibited range can be prohibited to thereby prevent the operation-prohibited range from being reached, whereas movement in the direction away from the operation-prohibited range can be easy.

Furthermore, the method for controlling the robot 1 includes updating the position command on a basis of the current external force when the degree of ease of exit is 0 or more, and updating the position command on a basis of a converted external force obtained by multiplying the current external force by an absolute value of the degree of ease of exit and a degree of approach, which becomes 0 at the boundary and approaches 1 as it is farther away from the boundary, when the degree of ease of exit is negative. Thus, movement in the direction away from the operation-prohibited range can be easy.

A direction which is the same as that of the reference external force is a direction in which the monitoring point has so far moved, and the operator desires to move the monitoring point in the direction. In this case, if movement in the direction is restricted, there may be an inconvenience in teaching operation. Accordingly, the direction toward the operation-prohibited range is permitted to some extent if it is the same as the direction of the reference external force. The degree of reduction of the external force is increased as the direction is farther away from the direction of the reference external force to thereby increase restriction of movement. Further, the restriction of movement increases by the degree of approach as the direction approaches the boundary.

Thus, movement is facilitated in the direction away from the operation-prohibited range. Further, movement in the direction toward the operation-prohibited range is permitted if it is in the same direction as that at the time of reaching the proximity region, and possibilities of inconvenience in teaching operation can be reduced. Since the restriction of movement is increased as the direction is farther away from the direction at the time of reaching, it is possible to prevent the operation-prohibited range from being unintentionally reached.

Furthermore, the method for controlling the robot 1 includes updating the position command on a basis of a converted external force obtained by multiplying the current external force by the degree of ease of exit when the degree of ease of exit is 0 or more, and updating the position command on a basis of a converted external force obtained by multiplying the current external force by a degree of approach, which becomes 0 at the boundary and approaches 1 as it is farther away from the boundary, when the degree of ease of exit is negative.

As described above, the direction of the reference external force is a direction in which the monitoring point has so far moved, and the opposite direction can be regarded as a region into which the monitoring point can move while avoiding contact. Accordingly, by updating the position command on the basis of the converted external force obtained by multiplying the current external force by the degree of ease of exit, movement in the direction opposite to that of the reference external force becomes least restricted, guiding to a safer path when moving away from the proximity of the operation-prohibited range.

That is, since the external force is less reduced as it is closer to the direction opposite to the direction of the external force at the time of reaching, movement is not restricted and thus the feel is not made heavy in the direction opposite to the direction of the external force at the time of reaching, that is, in the direction of the path in which the monitoring point has so far moved. Accordingly, the usability is not reduced, and movement away from the proximity of the operation-prohibited range can be easy. Further, movement in the direction toward the operation-prohibited range is more restricted by making the feel heavier as it is closer to the operation-prohibited range. Accordingly, it is possible to prevent the operation-prohibited range from being unintentionally reached.

Furthermore, the method for controlling the robot 1 includes updating the position command on a basis of a converted external force obtained by multiplying the current external force by the degree of ease of exit when the degree of ease of exit is 0 or more, and updating the position command on a basis of a converted external force obtained by multiplying the current external force by 0 when the degree of ease of exit is negative. Accordingly, as described above, movement in the direction opposite to that of the reference external force becomes least restricted, guiding to a safer path when moving away from the proximity of the operation-prohibited range. Further, since movement in the direction toward the operation-prohibited range is regulated, it is possible to prevent the operation-prohibited range from being reached.

Furthermore, the method for controlling the robot 1 includes updating the position command on a basis of a converted external force obtained by multiplying the current external force by the degree of ease of exit when the degree of ease of exit is 0 or more, and updating the position command on a basis of a converted external force obtained by multiplying the current external force by an absolute value of the degree of ease of exit and a degree of approach, which becomes 0 at the boundary and approaches 1 as it is farther away from the boundary, when the degree of ease of exit is negative.

Accordingly, as described above, movement in the direction opposite to that of the reference external force becomes least restricted, guiding to a safer path when moving away from the proximity of the operation-prohibited range. In addition, the direction toward the operation-prohibited range is permitted to some extent if it is the same as the direction of the reference external force. Further, movement is more restricted as it is farther away from the direction of the reference external force and closer to the boundary. Thus, it is possible to prevent the operation-prohibited range from being reached. Moreover, the external force is more reduced and thus the feel of the arm becomes relatively heavier as the direction of the current external force is closer to that of the external force at the time of reaching. Accordingly, the operator can intuitively recognize that the direction is approaching the operation-prohibited range.

Furthermore, the method for controlling the robot 1 includes, when the current position reaches the boundary of the operation-allowed range, updating the position command on a basis of a converted external force obtained by multiplying the current external force by 0 when the current external force is in a direction toward the operation-prohibited range to thereby prohibit movement in the direction, and updating the position command on a basis of the current external force when the current external force is in a direction away from the boundary. Accordingly, since movement in the direction toward the operation-prohibited range can be prohibited without calculating an inner product value, it is possible to prevent the operation-prohibited range from being reached.

Second Embodiment

Figure 11:
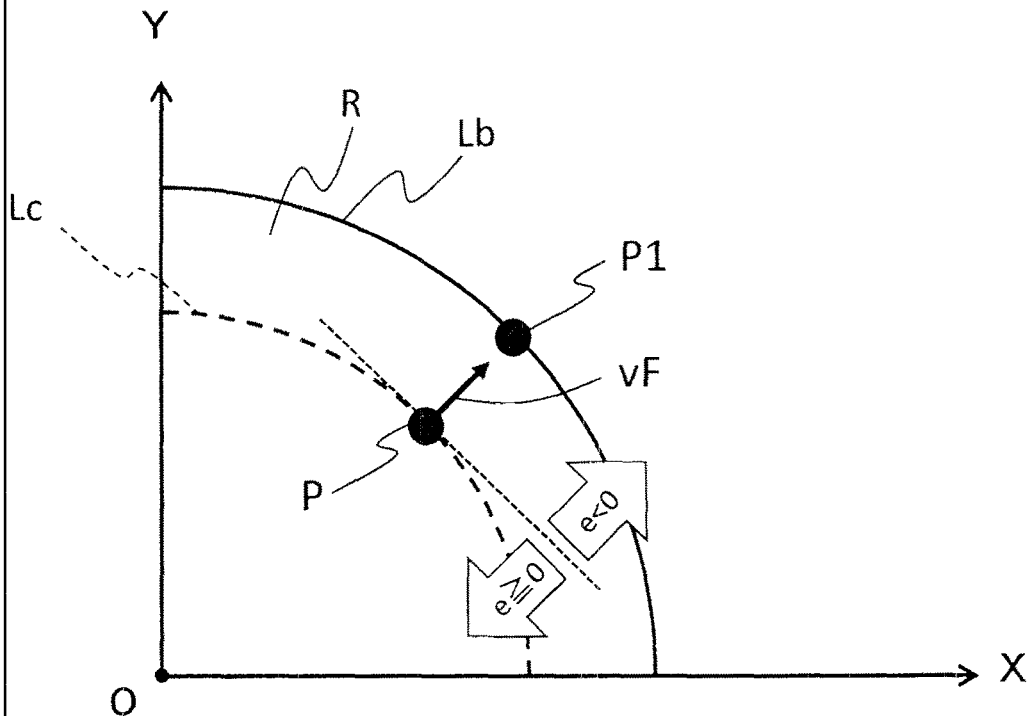
FIG. 11 is a diagram schematically illustrating a mode for determining a direction according to a second embodiment.
Figure 11:
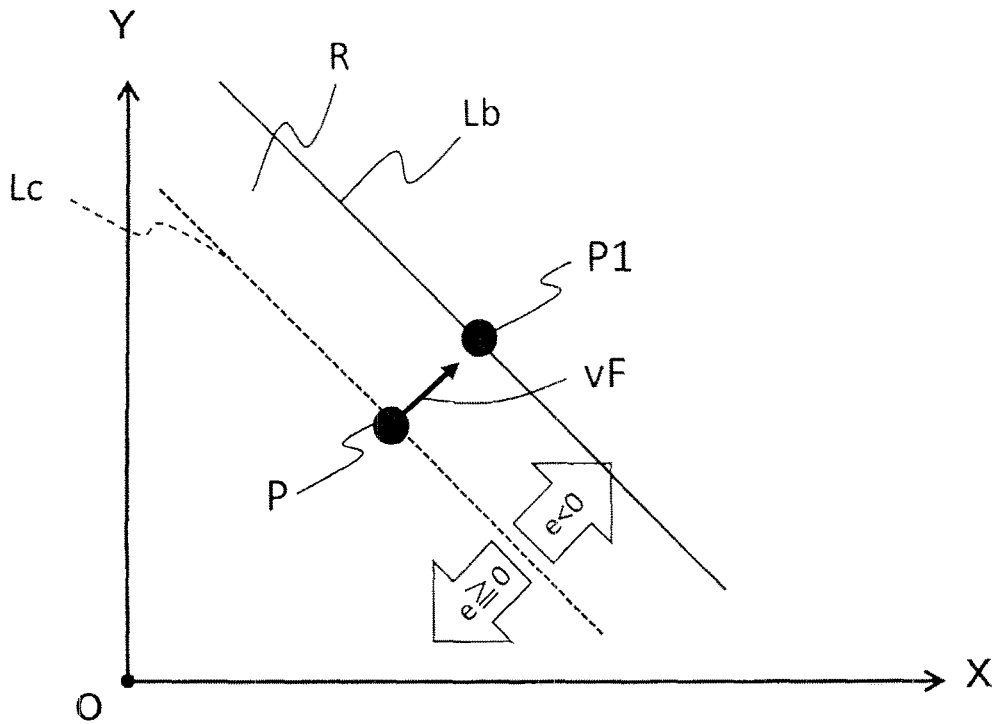

Referring to FIG. 11, a second embodiment will now be described. A method for controlling the robot 1 according to the second embodiment differs from the first embodiment in that the direction that facilitates movement away from the proximity region is determined on the basis of a shape of the boundary or a distance to the boundary. The configuration of the robot 1 is the same as that of the first embodiment, so the same reference numerals are used and the detailed description will be omitted.

While the proximity region (R) is in the proximity of the operation-prohibited range, there may be a case where it is necessary to change the posture of the robot 1 in the proximity region, that is, to move the monitoring point (P) in the proximity region. As the current position changes in the proximity region (R), the direction toward the operation-prohibited range from the current position, in other words, the direction in which exiting the proximity region (R) is easy, may also change.

Therefore, in the present embodiment, a virtual external force toward the operation-prohibited range starting from the current position is set as a reference external force on the basis of the shape of the boundary which is closest to the current position, or the distance to the boundary. The reference external force is compared with the current external force to thereby determine a direction that facilitates movement away from the proximity region. In this case, in order to determine whether the direction is directed to the operation-prohibited range or not, the direction of the reference external force is of importance, and the magnitude thereof is not so important. Therefore, for example, for the magnitude of the reference external force, a reference value can be set in advance or the magnitude of the current external force can be used for convenience.

In this case, as shown in the distance pattern in FIG. 11, a neighbor point (P1) is specified on the boundary closest to the current position of the monitoring point (P) so that the direction from the current position toward the neighbor point (P1) is taken as the direction toward the operation-prohibited range. Then, a virtual reference external force (vF) directed in this direction, starting from the current position, is set, and the reference external force (vF) is compared with a current external force, for example, the end force (Fcur) to thereby determine a direction that facilitates movement away from the proximity region. In this case, the current movement direction can be determined by obtaining the inner product of the end force (Fcur) and the reference external force (vF) as in the first embodiment. However, the current movement direction can also be determined by methods other than obtaining the inner product.

Thus, by determining the current movement direction on the basis of the current position of the monitoring point (P) and the neighbor point (P1), that is, the distance between the current position and the boundary, it is possible, as with the first embodiment, to specify whether the current movement direction is a direction that should be restricted or not, and to specify a direction that facilitates exiting.

Alternatively, as shown in the shape pattern in FIG. 11, in the case where the closest boundary is formed by a flat surface such as a wall, a direction, for example, vertical to the flat surface, starting from the current position, is set as a direction toward the operation-prohibited range. On the basis of the reference external force (vF) directed in this direction, the direction that facilitates exiting from the proximity region can be determined to thereby specify whether the current movement direction is a direction that should be restricted or not, and specify a direction that facilitates exiting.

Therefore, as with the first embodiment, control can be performed to restrict movement in the direction toward the operation-prohibited range, and permit movement in the direction that facilitates exiting. Accordingly, the usability during direct teaching can be improved. Further, even if the current position of the monitoring point (P) changes in the proximity region (R), it is possible to specify the movement direction that should be restricted and the direction that facilitates exiting in accordance with the change.

In this case, any of the reduction patterns A to F described in the first embodiment can also be combined. For example, by using the virtual reference external force (vF) instead of the end force in reaching (Finc) described in the first embodiment, the same advantageous effects as those of the reduction patterns A to F described in the first embodiment can be achieved in the control method of the present embodiment.

Third Embodiment

Figure 12:
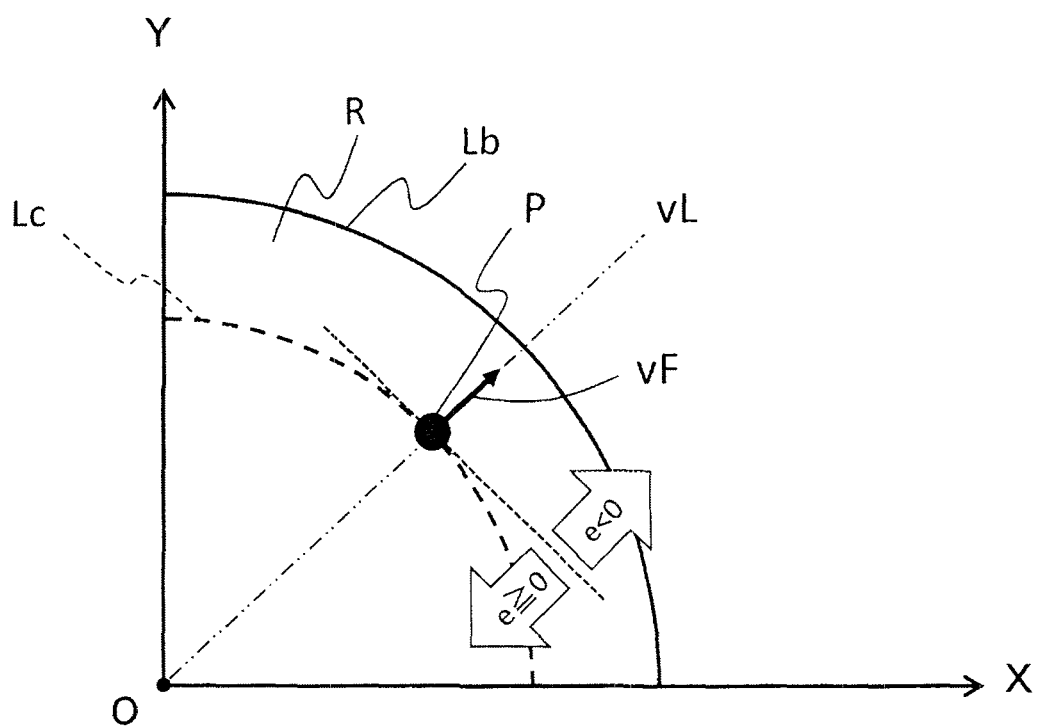
FIG. 12 is a diagram schematically illustrating a mode for determining a direction according to a third embodiment.

Referring to FIG. 12, a third embodiment will now be described. A method for controlling the robot 1 according to the third embodiment differs from the first embodiment in that the direction that facilitates movement away from the proximity region is determined on the basis of a virtual external force which is directed from the origin of the robot to the current position. The configuration of the robot 1 is the same as that of the first embodiment, so the same reference numerals are used and the detailed description will be omitted.

While the proximity region (R) is in the proximity of the operation-prohibited range, there may be a case where it is necessary to change the posture of the robot 1 in the proximity region, that is, to move the monitoring point (P) in the proximity region. As the current position changes in the proximity region (R), the direction toward the operation-prohibited range from the current position, in other words, the direction in which exiting the proximity region (R) is easy, may also change.

In addition, the operation-allowed range may be set as a range that the arm of the robot can reach. Therefore, a situation can be assumed where the robot arm is fully extended at the boundary of the operation-allowed range. In other words, the direction in which the robot arm is retracted can be regarded as the direction in which it exits the operation-prohibited range. For example, if the robot arm has a reach limit, the direction toward the origin (O) of the robot is taken as the direction in which the arm is retracted, which is the direction in which exiting is easiest.

Therefore, in the present embodiment, a virtual external force, starting from the current position of the monitoring point (P) provided in the robot 1, in the direction from the origin (O) of the robot toward the current position is set as the reference external force (vF). The reference external force is compared with the current external force to thereby determine a direction that facilitates movement away from the proximity region. In this case, in order to determine whether the direction is directed to the operation-prohibited range or not, the direction of the reference external force is of importance, and the magnitude thereof is not so important. Therefore, for example, for the magnitude of the reference external force, a reference value can be set in advance or the magnitude of the current external force can be used for convenience.

In this case, as shown in FIG. 12, a virtual line (vL) that passes through the current position of the monitoring point (P) and the origin (O) is set, and a direction, starting from the current position, in a direction along the virtual line (vL) toward outside the current position is taken as the direction toward the operation-prohibited range. Accordingly, a virtual reference external force (vF) directed in this direction, starting from the current position, is set, and the reference external force (vF) is compared with a current external force, for example, the end force (Fcur) to thereby determine a direction that facilitates movement away from the proximity region. In this case, the current movement direction can be determined by obtaining the inner product of the end force (Fcur) and the reference external force (vF) as in the first embodiment. However, the current movement direction can also be determined by methods other than obtaining the inner product.

Thus, on the basis of the reference external force (vF) directed along the virtual line (vL) that passes the current position and the origin (O), starting from the current position, the direction that facilitates exiting from the proximity region can be determined to thereby specify whether the current movement direction is a direction that should be restricted or not, and specify a direction that facilitates exiting. Therefore, control can be performed, for example, to restrict movement in the direction toward the operation-prohibited range, and permit movement in the direction that facilitates exiting to thereby improve usability during direct teaching.

Therefore, as with the first embodiment, control can be performed to restrict movement in the direction toward the operation-prohibited range, and permit movement in the direction that facilitates exiting. Accordingly, the usability during direct teaching can be improved. Further, even if the current position of the monitoring point (P) changes in the proximity region (R), it is possible to specify the movement direction that should be restricted and the direction that facilitates exiting in accordance with the change.

In this case, any of the reduction patterns A to F described in the first embodiment can also be combined. For example, by using the virtual reference external force (vF) instead of the end force in reaching (Finc) described in the first embodiment, the same advantageous effects as those of the reduction patterns A to F described in the first embodiment can be achieved in the control method of the present embodiment.

Fourth Embodiment

Figure 13:
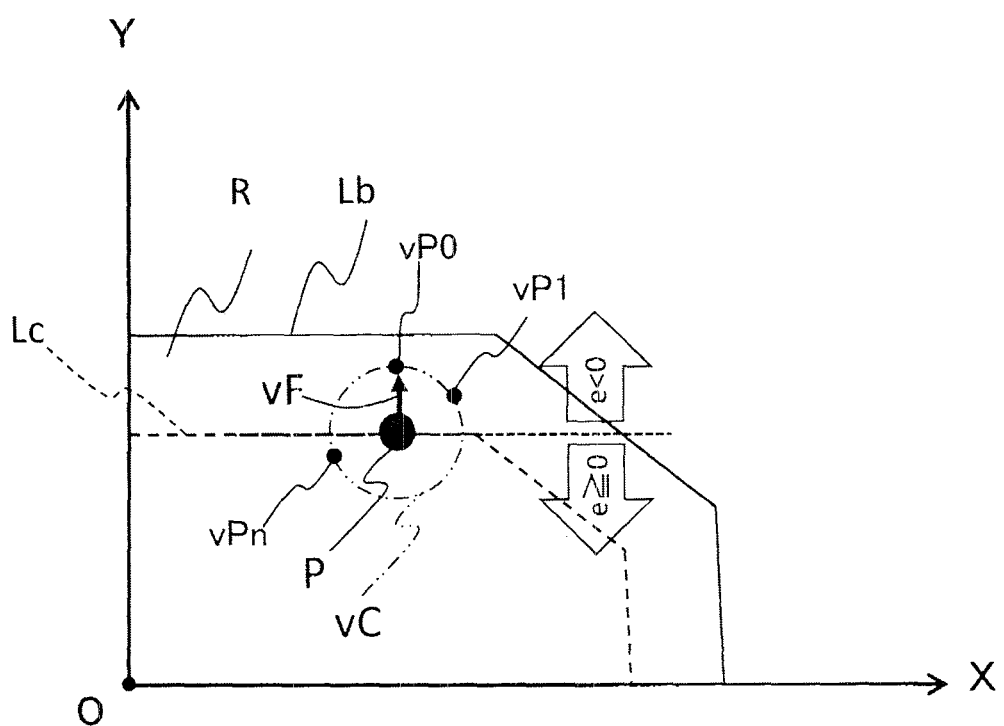
FIG. 13 is a diagram schematically illustrating a mode for determining a direction according to a fourth embodiment.

Referring to FIG. 13, a fourth embodiment will now be described. A method for controlling the robot 1 according to the fourth embodiment differs from the first embodiment in that the direction that facilitates movement away from the proximity region is determined on the basis of a distance to the boundary in the case where the current position is assumed to have been displaced. The configuration of the robot 1 is the same as that of the first embodiment, so the same reference numerals are used and the detailed description will be omitted.

While the proximity region (R) is in the proximity of the operation-prohibited range, there may be a case where it is necessary to change the posture of the robot, that is, to move the monitoring point (P) in the proximity region (R). As the current position changes in the proximity region (R), the direction toward the operation-prohibited range from the current position, in other words, the direction in which exiting the proximity region (R) is easy, may also change.

Therefore, in the present embodiment, among virtual positions (vP) displaced from the current position of the monitoring point (P) provided in the robot 1 by a predetermined distance, a position closest to the boundary is set as a closest approach position (vP), a virtual external force, starting from the current position of the monitoring point (P), in the direction from the current position toward the closest approach position (vP) is set as the reference external force (vF). The reference external force is compared with the current external force to thereby determine a direction that facilitates movement away from the proximity region. In this case, in order to determine whether the direction is directed to the operation-prohibited range or not, the direction of the reference external force is of importance, and the magnitude thereof is not so important. Therefore, for example, for the magnitude of the reference external force, a reference value can be set in advance or the magnitude of the current external force can be used for convenience.

Specifically, as shown in FIG. 13, a virtual circle (vC) is set about the center of the current position, and a plurality of virtual positions (vP0 to vPn) are set on the virtual circle (vC). Among the virtual positions (vP0 to vPn), the virtual position (vP0), for example, which is closest to the boundary is specified as a closest approach position. This is because movement from the current position of the monitoring point (P) toward the closest approach position is most likely to be directed to the operation-prohibited range.

Then, a virtual reference external force (vF), starting from the current position, in the direction toward the closest approach position is set. The reference external force is compared with the current external force to thereby determine a direction that facilitates movement away from the proximity region, and specify a direction that tends to allow movement out of the operation-allowed range, that is, the direction that should be restricted, and specify a direction that facilitates exiting.

Therefore, as with the first embodiment, control can be performed to restrict movement in the direction toward the operation-prohibited range, and permit movement in the direction that facilitates exiting. Accordingly, the usability during direct teaching can be improved. Further, even if the current position of the monitoring point (P) changes in the proximity region (R), it is possible to specify the movement direction that should be restricted and the direction that facilitates exiting in accordance with the change.

In this case, any of the reduction patterns A to F described in the first embodiment can also be combined. For example, by using the virtual reference external force (vF) instead of the end force in reaching (Finc) described in the first embodiment, the same advantageous effects as those of the reduction patterns A to F described in the first embodiment can be achieved in the control method of the present embodiment.

OTHER EMBODIMENTS

In the embodiments described above, the center position of the flange 1g is set as the monitoring point (P) of the robot 1. However, the monitoring point (P) of the robot 1 is not limited to the center position of the flange 1g, and may be provided at any position in the arm or the tool 3. The shape of the robot 1 and the outline of the arm are mechanically fixed, and the shape of the tool 3 for use in work can also be specified in advance. If the shape can be mechanically fixed, the monitoring point (P) set at a desired position can be specified on the basis of the posture of the robot 1.

Therefore, even if the monitoring point (P) is set at a desired position, the current position and the applied external force can be specified, and the control method described above can be used to control the robot 1. That is, the monitoring point (P) for monitoring intrusion into the operation-prohibited range can be provided at any position (shoulder, elbow, etc.) in addition to the end portion. When the end position is moved according to the end force, link positions are determined in the process of calculating an articulation angle from a target position (inverse kinematics calculation). Accordingly, the monitoring position, which moves along with the end portion, can be obtained by setting the monitoring position as a position in the link coordinate system in advance. For example, setting a monitoring site at a raised portion of the robot can contribute to prevention of collision with obstacles around the robot.

Moreover, a controller such as the controller 2 that can implement the control method described above can be used to control the robot 1 to thereby prevent reduction in usability during direct teaching.

In the embodiments described above, the current position of the monitoring point (P) is specified by the six dimensional coordinate system. However, other coordinate systems can also be used with parameters that uniquely specify the current position of the monitoring point (P), the posture and the operation-allowed range of the robot 1. For example, the operation-allowed range can be defined by setting limits such as an upper limit by software using T-parameters or J-parameters.

Throughout the drawings, a reference numeral 1 indicates the robot and a reference numeral 2 indicates the controller (control apparatus) provided with the CPU 2A.

What is claimed is:

1. A method for controlling a robot, in which direct teaching is performed while updating a position command on a basis of an applied external force, the method comprising steps of:

setting a proximity region inside a boundary of an operation-allowed range of the robot, the proximity region being indicative of a proximity of the boundary;

storing an external force applied when a monitoring point provided in the robot reaches the proximity region as a reference external force; and comparing the reference external force with a current external force when a current position of the monitoring point is in the proximity region to thereby determine a direction that facilitates movement away from the proximity region.

2. The method for controlling a robot according to claim 1, further comprising:
calculating an inner product of a vector of the current external force and an inverse vector of the reference external force; and
determining that movement is in a direction away from the operation-prohibited range if the calculated inner product value is 0 or more, and that movement is in a direction toward the operation-prohibited range if the calculated inner product value is negative.

3. The method for controlling a robot according to claim 1, further comprising:
calculating a degree of ease of exit by performing an inner product of a vector of the current external force and an inverse vector of the reference external force, the inner product providing an inner product value that is the degree of ease of exist, the inner product value being between a smallest negative value in a same direction and the reference external force and a largest positive value in an opposite direction to the reference external force; and
updating the position command based on the current external force when the degree of ease of exit is 0 or more, and updating the position command based on a converted external force obtained by multiplying the current external force by a degree of approach, the degree of approach becoming 0 at the boundary and approaches 1 as the robot is farther away from the boundary, when the degree of ease of exit is negative.

4. The method for controlling a robot according to claim 1, further comprising:
calculating a degree of ease of exit by performing an inner product of a vector of the current external force and an inverse vector of the reference external force, the inner product providing an inner product value that is the degree of ease of exit, the inner product being between a smallest negative value in a same direction as the reference external force and a largest positive value in an opposite direction to the reference external force; and
updating the position command based on the current external force when the degree of ease of exit is 0 or more, and updating the position command based on a converted external force obtained by multiplying the current external force by 0 when the degree of ease of exit is negative.

5. The method for controlling a robot according to claim 1, further comprising:
calculating a degree of ease of exit by performing an inner product of a vector of the current external force and an inverse vector of the reference external force, the inner product providing an inner product value that is the degree of ease of the exit, the inner product value being between a smallest negative value in a same direction as the reference external force and a largest positive value in an opposite direction to the reference external force; and
updating the position command based on the current external force when the degree of ease of exit is 0 or more, and updating the position command based on a converted external force obtained by multiplying the current external force by an absolute value of the degree of ease of exit and a degree of approach, which becomes 0 at the boundary and approaches 1 as the robot is farther away from the boundary, when the degree of ease of exit is negative.

6. The method for controlling a robot according to claim 1, further comprising:
calculating a degree of ease of exit by performing an inner product of a vector of the current external force and an inverse vector of the reference external force, the inner product providing an inner product value that is the degree of ease of the exit, the inner product value being between a smallest negative value in a same direction as the reference external force and a largest positive value in an opposite direction to the reference external force; and
updating the position command based on a converted external force obtained by multiplying the current external force by the degree of ease of exit when the degree of ease of exit is 0 or more, and updating the position command based on a converted external force obtained by multiplying the current external force by a degree of approach, which becomes 0 at the boundary and approaches 1 as the robot is farther away from the boundary, when the degree of ease of exit is negative.

7. The method for controlling a robot according to claim 1, further comprising:
calculating a degree of ease of exit by performing an inner product of a vector of the current external force and an inverse vector of the reference external force, the inner product providing an inner product value that is the degree of ease of the exit, the inner product value being between a smallest negative value in a same direction as the reference external force and a largest positive value in an opposite direction to the reference external force; and
updating the position command based on a converted external force obtained by multiplying the current external force by the degree of ease of exit when the degree of ease of exit is 0 or more, and updating the position command based on a converted external force obtained by multiplying the current external force by 0 when the degree of ease of exit is negative.

8. The method for controlling a robot according to claim 1, further comprising:
calculating a degree of ease of exit by performing an inner product of a vector of the current external force and an inverse vector of the reference external force, the inner product providing an inner product value that is the degree of ease of the exit, the inner product value being between a smallest negative value in a same direction as the reference external force and a largest positive value in an opposite direction to the reference external force; and
updating the position command based on a converted external force obtained by multiplying the current external force by the degree of ease of exit when the degree of ease of exit is 0 or more, and updating the position command based on a converted external force obtained by multiplying the current external force by an absolute value of the degree of ease of exit and a degree of approach, which becomes 0 at the boundary and approaches 1 as the robot is farther away from the boundary, when the degree of ease of exit is negative.

9. The method for controlling a robot according to claim 1, further comprising, when the current position reaches the boundary of the operation-allowed range, updating the position command on a basis of a converted external force obtained by multiplying the current external force by 0 when the current external force is in a direction toward the operation-prohibited range to thereby prohibit movement in the direction, and updating the position command on a basis of the current external force when the current external force is in a direction away from the boundary.

10. A method for controlling a robot, in which direct teaching is performed while updating a position command on a basis of an applied external force, the method comprising steps of:
setting a proximity region inside a boundary of an operation-allowed range of the robot, the proximity region being indicative of a proximity of the boundary;
setting a virtual external force toward the operation-prohibited range starting from a current position as a reference external force on a basis of a shape of a boundary which is closest to a current position of a monitoring point provided in the robot, or a distance to the boundary; and
comparing the reference external force with a current external force when a current position of the monitoring point is in the proximity region to thereby determine a direction that facilitates movement away from the proximity region.

11. The method for controlling a robot according to claim 10, further comprising:
calculating an inner product of a vector of the current external force and an inverse vector of the reference external force; and
determining that movement is in a direction away from the operation-prohibited range if the calculated inner product value is 0 or more, and that movement is in a direction toward the operation-prohibited range if the calculated inner product value is negative.

12. The method for controlling a robot according to claim 10, further comprising:
calculating a degree of ease of exit by performing an inner product of a vector of the current external force and an inverse vector of the reference external force, the inner product providing an inner product value that is the degree of ease of the exit, the inner product value being between a smallest negative value in a same direction as the reference external force and a largest positive value in an opposite direction to the reference external force; and
updating the position command based on the current external force when the degree of ease of exit is 0 or more, and updating the position command based on a converted external force obtained by multiplying the current external force by a degree of approach, which becomes 0 at the boundary and approaches 1 as the robot is farther away from the boundary, when the degree of ease of exit is negative.

13. The method for controlling a robot according to claim 10, further comprising:
calculating a degree of ease of exit by performing an inner product of a vector of the current external force and an inverse vector of the reference external force, the inner product providing an inner product value that is the degree of ease of the exit, the inner product value being between a smallest negative value in a same direction as the reference external force and a largest positive value in an opposite direction to the reference external force; and
updating the position command based on the current external force when the degree of ease of exit is 0 or more, and updating the position command based on a converted external force obtained by multiplying the current external force by 0 when the degree of ease of exit is negative.

14. The method for controlling a robot according to claim 10, further comprising:
calculating a degree of ease of exit by performing an inner product of a vector of the current external force and an inverse vector of the reference external force, the inner product providing an inner product value that is the degree of ease of the exit, the inner product value being between a smallest negative value in a same direction as the reference external force and a largest positive value in an opposite direction to the reference external force; and
updating the position command based on the current external force when the degree of ease of exit is 0 or more, and updating the position command based on a converted external force obtained by multiplying the current external force by an absolute value of the degree of ease of exit and a degree of approach, which becomes 0 at the boundary and approaches 1 as the robot is farther away from the boundary, when the degree of ease of exit is negative.

15. A method for controlling a robot, in which direct teaching is performed while updating a position command on a basis of an applied external force, the method comprising steps of:
setting a proximity region inside a boundary of an operation-allowed range of the robot, the proximity region being indicative of a proximity of the boundary;
setting a virtual external force, starting from a current position of a monitoring point provided in the robot, in a direction from an origin of the robot toward the current position as a reference external force; and
comparing the reference external force with a current external force when a current position of the monitoring point is in the proximity region to thereby determine a direction that facilitates movement away from the proximity region.

16. A method for controlling a robot, in which direct teaching is performed while updating a position command on a basis of an applied external force, the method comprising steps of:
setting a proximity region inside a boundary of an operation-allowed range of the robot, the proximity region being indicative of a proximity of the boundary;
setting a position closest to the boundary, among virtual positions displaced from a current position of a monitoring point provided in the robot by a predetermined distance, as a closest approach position;
setting a virtual external force, starting from a current position of the monitoring point, in a direction from the current position toward the closest approach position as a reference external force; and
comparing the reference external force with a current external force when a current position of the monitoring point is in the proximity region to thereby determine a direction that facilitates movement away from the proximity region.

* * * * *